US009003424B1

(12) United States Patent
Mendes Da Costa et al.

(10) Patent No.: US 9,003,424 B1
(45) Date of Patent: *Apr. 7, 2015

(54) SNAPSHOT VIEW OF MULTI-DIMENSIONAL VIRTUAL ENVIRONMENT

(71) Applicant: Google Inc., Mountain View, CA (US)

(72) Inventors: Alexander Mendes Da Costa, San Francisco, CA (US); Phillip Craig Keslin, San Jose, CA (US); Joey Chiu-Wen Liaw, San Francisco, CA (US); Vernon Melvin Guymon, III, Seattle, WA (US); Niniane Wang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/106,511

(22) Filed: Dec. 13, 2013

Related U.S. Application Data

(63) Continuation of application No. 13/620,083, filed on Sep. 14, 2012, now Pat. No. 8,631,417, which is a continuation of application No. 11/936,053, filed on Nov. 6, 2007, now Pat. No. 8,375,397.

(51) Int. Cl.
| | |
|---|---|
| *G06F 3/00* | (2006.01) |
| *G06F 15/16* | (2006.01) |
| *H04L 29/06* | (2006.01) |
| *H04L 29/08* | (2006.01) |
| *G06F 9/54* | (2006.01) |

(52) U.S. Cl.
CPC .............. *H04L 65/403* (2013.01); *H04L 67/14* (2013.01); *G06F 9/54* (2013.01)

(58) Field of Classification Search
CPC ........ G06F 9/54; G06F 3/04815; H04L 67/14
See application file for complete search history.

(56) References Cited

U.S. PATENT DOCUMENTS

| | | | |
|---|---|---|---|
| 5,995,106 | A | 11/1999 | Naughton et al. |
| 6,026,409 | A | 2/2000 | Blumenthal |
| 6,119,147 | A | 9/2000 | Toomey et al. |
| 6,166,732 | A | 12/2000 | Mitchell et al. |
| 6,175,842 | B1 | 1/2001 | Kirk et al. |
| 6,219,045 | B1 | 4/2001 | Leahy et al. |

(Continued)

OTHER PUBLICATIONS

Andreas Bauer, The Cube-Query-Language( CQL) for Multidimensional Statistical and Scientific Database Systems, Apr. 1997.*

(Continued)

*Primary Examiner* — Lechi Truong
(74) *Attorney, Agent, or Firm* — Patent Law Works LLP

(57) ABSTRACT

A computer-implemented method of enabling communication between a first client and a second client mutually participating in a communication session, in which the second client, but not the first client, has an application for rendering multi-dimensional virtual environments, is claimed. The method includes transmitting to the second client information representing a plurality of objects in a multi-dimensional virtual environment, wherein the multi-dimensional virtual environment is rendered at the second client, and transmitting to the first client an image for display by a first client application in a web page, the image including a representation of the multi-dimensional virtual environment rendered at the second client. The second client has an application, distinct from the first client application, for rendering multi-dimensional virtual environments.

18 Claims, 18 Drawing Sheets

(56) References Cited

U.S. PATENT DOCUMENTS

| | | | |
|---|---|---|---|
| 6,271,843 B1 | 8/2001 | Lection et al. | |
| 6,608,628 B1* | 8/2003 | Ross et al. | 345/619 |
| 6,684,255 B1 | 1/2004 | Martin | |
| 6,687,877 B1 | 2/2004 | Sastry et al. | |
| 6,738,804 B1 | 5/2004 | Lo | |
| 6,954,728 B1 | 10/2005 | Kusumoto et al. | |
| 7,006,098 B2 | 2/2006 | Bickmore et al. | |
| 7,139,767 B1 | 11/2006 | Taylor et al. | |
| 7,148,892 B2 | 12/2006 | Robertson et al. | |
| 7,650,378 B2 | 1/2010 | Shafron et al. | |
| 8,190,733 B1 | 5/2012 | Hoffman et al. | |
| 2001/0019330 A1 | 9/2001 | Bickmore et al. | |
| 2002/0030679 A1 | 3/2002 | McDowall et al. | |
| 2002/0080173 A1 | 6/2002 | Tagami et al. | |
| 2002/0161590 A1 | 10/2002 | Sakakibara et al. | |
| 2003/0005439 A1 | 1/2003 | Rovira | |
| 2003/0194062 A1 | 10/2003 | Nelson et al. | |
| 2004/0006566 A1 | 1/2004 | Taylor et al. | |
| 2004/0051745 A1 | 3/2004 | Gargi | |
| 2004/0145594 A1 | 7/2004 | Kobayashi et al. | |
| 2004/0229689 A1 | 11/2004 | Nishimura | |
| 2004/0233171 A1 | 11/2004 | Bell et al. | |
| 2004/0254904 A1 | 12/2004 | Nelken et al. | |
| 2005/0086612 A1 | 4/2005 | Gettman et al. | |
| 2005/0116964 A1 | 6/2005 | Kotake et al. | |
| 2006/0007341 A1 | 1/2006 | Nakamura et al. | |
| 2006/0236328 A1* | 10/2006 | DeWitt | 719/329 |
| 2007/0087799 A1 | 4/2007 | Van Luchene et al. | |
| 2007/0134644 A1 | 6/2007 | Jones et al. | |
| 2007/0210937 A1 | 9/2007 | Smith et al. | |
| 2007/0238520 A1 | 10/2007 | Kacmarcik | |
| 2008/0015003 A1 | 1/2008 | Walker et al. | |
| 2008/0027984 A1 | 1/2008 | Perdomo et al. | |
| 2008/0059570 A1 | 3/2008 | Bill | |
| 2008/0076556 A1 | 3/2008 | Icart | |
| 2008/0134056 A1 | 6/2008 | Shuster | |
| 2008/0163379 A1 | 7/2008 | Robinson et al. | |
| 2008/0214253 A1 | 9/2008 | Gillo et al. | |
| 2008/0222295 A1 | 9/2008 | Robinson et al. | |
| 2009/0099925 A1 | 4/2009 | Mehta et al. | |
| 2009/0106671 A1 | 4/2009 | Olson et al. | |
| 2009/0112906 A1 | 4/2009 | Shuster | |
| 2009/0113349 A1 | 4/2009 | Zohar et al. | |
| 2009/0144267 A1 | 6/2009 | Cook et al. | |
| 2009/0318224 A1 | 12/2009 | Ealey | |

OTHER PUBLICATIONS

Keith Andrews, Visualising Cyberspace: Information Visualisation in the Harmony Internet Browser, 1995.

Manninen, "Interaction in Networked Virtual Environments as Communicative Action: Social Theory and Multi-player Games", 2000, In proceedings of CRIWG2000 Workshop, IEEE computer Society Press, pp. 154-157.

Boyer et al., "Virtual Social Clubs: Meeting Places for the Internet Community", Jul. 1999, Multimedia Computing and Systems, 1999. IEEE International Conference on, vol. 2, pp. 297-301.

Choi, Insook et al. "Human-Machine Performance Configuration for Multidimensional and Multi-modal Interaction in Virtual Environments," Proceedings of the Fourth Symposium on Human Interaction with Complex Systems, HICS 1998, 13 pages, IEEE Computer Society, Washington, DC.

How to Create a Teleport Link in Second Life, wb.archive.org/web/20060526221350/http://cterport.ed.uiuc.edu/technologies-fol . . . , accessed Oct. 27, 2010, 3 pages.

Second Life Developer's Corner: Display External XML-Resources on Objects in Second Life, "SL Developer's Corner," Mar. 14, 2007, 4 pages.

* cited by examiner

US 9,003,424 B1

SNAPSHOT VIEW OF MULTI-DIMENSIONAL VIRTUAL ENVIRONMENT

CROSS-REFERENCE TO RELATED APPLICATIONS

This application is the continuation of, and claims priority under 35 USC §120 to U.S. application Ser. No. 13/620,083, filed Sep. 14, 2012, titled "Snapshot View of Multi-Dimensional Virtual Environment", which is a continuation of U.S. application Ser. No. 11/936,053, filed Nov. 6, 2007, titled "Snapshot View of Multi-Dimensional Virtual Environment."

This application is related to the following U.S. patent application, which is incorporated by reference herein in its entirety: U.S. patent application Ser. No. 11/935,385, filed Nov. 5, 2007, "Chat Text Distribution to Clients in Multi-Dimensional Virtual Environment".

TECHNICAL FIELD

The disclosed embodiments relate generally to a multi-dimensional computing environment, and more particularly, to a network enabled multi-dimensional computing environment.

BACKGROUND

Virtual worlds, such as three dimensional (3D) virtual worlds, as enabled for instance by languages such as Virtual Reality Modeling Language (VRML), provide a number of advantages over two dimensional documents. For instance, three dimensional virtual worlds hold a promising future in the area of electronic commerce, as users of an electronic store or electronic mall can shop through the store and see and inspect the items that are available for purchase or rental. It is also anticipated that virtual worlds will become prevalent in business and social environments as well.

SUMMARY

A first client and a second client mutually participate in a communication session, in which the second client, but not the first client, has an application for rendering multi-dimensional virtual environments. Information representing a plurality of objects in a multi-dimensional virtual environment is transmitted to the second client. The multi-dimensional virtual environment is rendered at the second client. An image for display by a client application is transmitted to the first client. The image includes a representation of the multi-dimensional virtual environment rendered at the second client. The second client has an application, distinct from the client application at the first client, for rendering multi-dimensional virtual environments.

BRIEF DESCRIPTION OF THE DRAWINGS

Like reference numerals refer to corresponding parts throughout the drawings.

DESCRIPTION OF EMBODIMENTS

Reference will now be made in detail to embodiments of multi-dimensional virtual environments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, networks and the like have not been described in detail so as not to unnecessarily obscure aspects of the embodiments.

Figure 1:
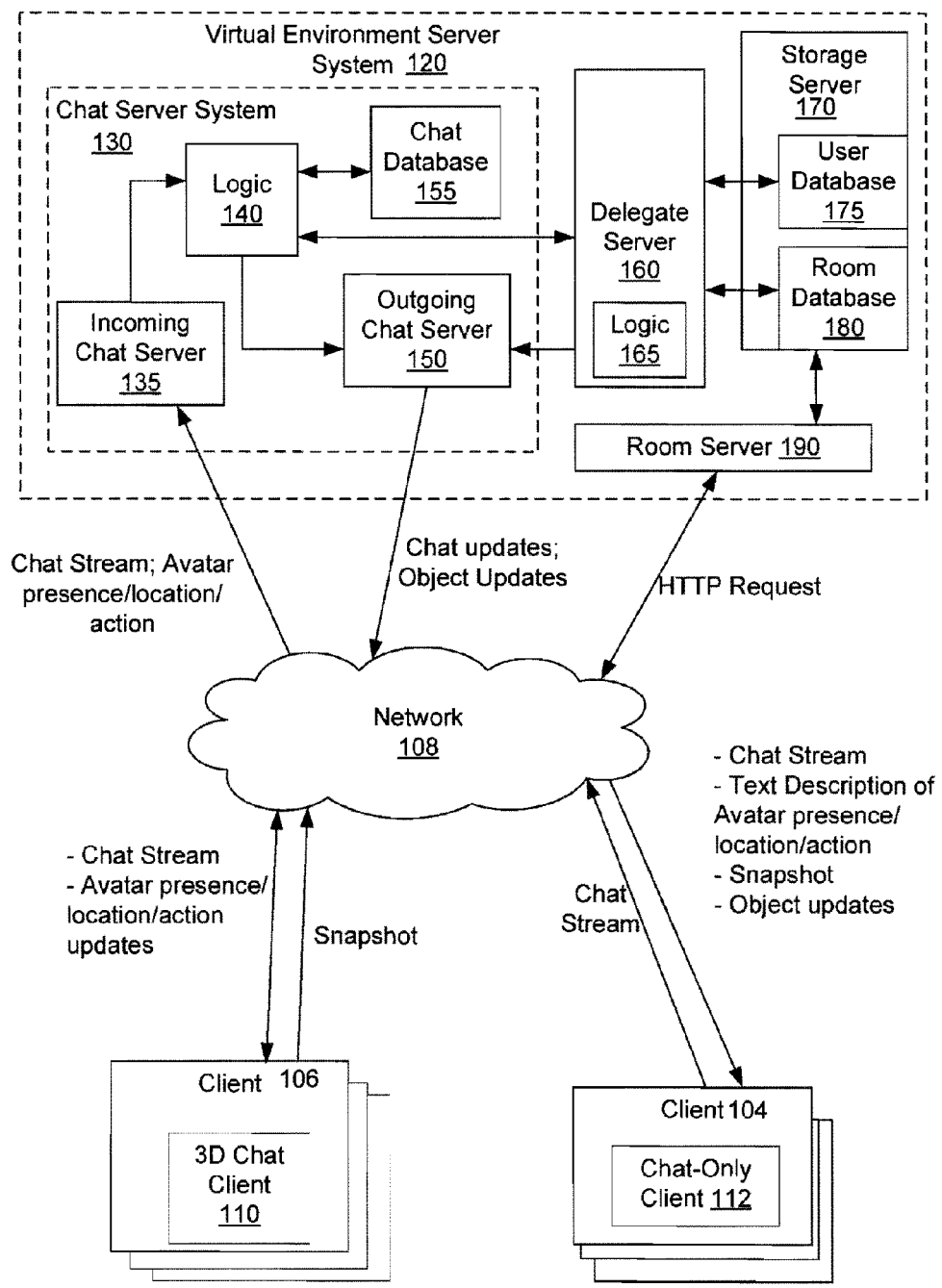
FIG. 1 is a block diagram illustrating an example of a distributed computer system according to some embodiments of the invention.

The following discussion, which precedes the description of FIG. 1, is provided for the purpose of providing the reader with some context for the technical description of the embodiments. However, it should be understood that this discussion is not a description of any particular invention, and none of the features or operations should be assumed to be elements of any particular invention, unless those particular features or operations are specifically identified in the claims. In the embodiments described below, a "virtual environment" server system enables users to interact with other users in virtual environments. Each virtual environment has a set of objects that create the look and feel of the virtual environment. The users of a virtual environment can modify the properties of objects, add objects to the virtual environment, and can interact with other users currently resident in the virtual environment. Some users may be given greater control over the objects in a virtual environment than others. In a three dimensional (3D) virtual environment, the environment has three dimensional objects and the users (as represented by avatars) move about the virtual environment in three dimensions. The client device or system used by each user resident in the three dimensional environment can display a view of the three dimensional virtual environment from a particular vantage point (e.g., a particular location in, above, or along the periphery of the virtual environment). A user may be able to move or select the vantage point from which he/she views the three dimensional virtual environment.

In addition to the objects that occupy a virtual environment, each of the users currently resident in a virtual environment are represented by special objects called avatars. Each user selects his/her avatar, which can include numerous features, sub-objects and/or properties (e.g., clothing, hair styles). Avatars also can perform actions (e.g., talk, laugh, walk, move objects, etc.) under the control of their users. The types of actions that an avatar can perform depend on the properties of the particular avatar, and thus some avatars may have different capabilities than other avatars.

In addition to objects and avatars (which can be considered to be a special type or class of objects), virtual environments also function as chat rooms, enabling the current residents of a virtual environment to exchange messages in much the same way as the users of Internet chat rooms.

FIG. 1 is a block diagram illustrating an exemplary distributed computer system 100 according to one embodiment of the invention. This system includes clients 104 and clients 106, a virtual environment server system 120, and communication network(s) 108 for interconnecting these components. Clients 104, 106 may include client computer systems, and/or client devices (e.g., smart phones, cell phones, personal digital assistants, kiosks, etc.).

The virtual environment server system 120 includes a chat server system 130. The chat server system 130 includes an incoming chat server 135 to receive chat streams from clients 104 and clients 106. The incoming chat server 135 also receives information associated with avatar object presence, location and action from clients 106. In some embodiments, the incoming chat server 135 receives the chat stream data and avatar object presence, location and action over network 108 using TCP/IP.

The outgoing chat server 150 sends chat updates to clients 104 and clients 106. The outgoing chat server 150 also sends object updates, including avatar object updates, to clients 104 and clients 106. Although in FIG. 1, incoming chat server 135 and outgoing chat server 150 are shown as two separate servers, in some embodiments, these can be combined.

The chat server system 130 includes logic 140 to delegate processing required for sending updates to clients 104 and clients 106 and/or responding to client queries and requests. Although logic 140 is shown in FIG. 1 as a separate module, it may be a part of the incoming chat server 135 and/or the outgoing chat server 150. Logic 140 determines whether to delegate processing to the delegate server 160 before data can be sent to clients. For instance, if logic 140 determines that semantic analysis is required before data can be communicated with clients, or that data needs to be stored by storage server 170 in addition to being communicated with clients, then it is first routed to the delegate server 160 for the semantic analysis or data storage. The delegate server 160 performs actions that are delegated by logic 140. Delegate server 160 includes logic 165, for instance for performing semantic analysis or sending data updates to storage server 170, as discussed below in reference to FIG. 15.

The chat server system 130 includes a chat database 155. Chat database 155 stores chat information associated with each multi-dimensional virtual environment (also referred to herein as a "room") that logically exists on the virtual environment server system 120. Chat database 155 is further discussed with reference to FIG. 6.

The virtual environment server system 120 includes a storage server 170 that includes a room database 180 and a user database 175. User database 175 stores an inventory of avatar objects for each user of the virtual environment server system 120 and is further discussed with reference to FIG. 6. Room database 180 stores room definitions (also called virtual environment definitions), and is further discussed with reference to FIGS. 4 and 5.

The virtual environment server system 120 also includes a room server 190 that responds to HTTP requests for virtual environment data from a client 106. For instance, in response from an HTTP request from client 106, the room server 190 accesses the storage server 170 to enable a download of virtual environment data, such as room definitions, to the client 106. In some embodiments, requests are made both to the storage server 170 and to the room server 190. For example, the room server 190 serves browser HTTP requests (e.g. for web pages such as a list of all the rooms available), and the storage server 170 serves HTTP requests made by the 3D client application 110. In some embodiments, one or more servers depicted in FIG. 1 may be combined.

The virtual environment server system 120 enables a number of clients 106 with respective 3D client applications 110 and a number of clients 104 with respective client applications 112 to participate in communication sessions that include one or more multi-dimensional virtual environments. Multiple multi-dimensional virtual environments logically exist on the virtual environment server system 120. Client application 110 renders one or more multi-dimensional virtual environments at the client 106. Thus, client application 110 enables client 106 to navigate and participate in multi-dimensional virtual environments. Client application 110 is discussed in greater detail with reference to FIGS. 2 and 3A, and is sometimes referred to herein as a "3D client application," or as a "3D chat client application." Client application 112, on the other hand, enables the user of client 104 to participate in chat sessions with other users resident in the same chat room or virtual environment as the user. Client application 112 is discussed in greater detail with reference to FIGS. 2 and 3B, and is sometimes referred to herein as a "chat-only client application," to help distinguish it from client application 110, which enables full participation in the virtual environments hosted by the virtual environment server system 120.

The virtual environment server system 120 transmits to a client 106 with 3D client application 110 chat text received from other clients 106 and clients 104 participating in a mutual communication session. The virtual environment server system 120 also transmits to clients 106 information describing a multi-dimensional virtual environment, which is rendered by the 3D client application 110, thus enabling clients 106 to navigate and participate in the multi-dimensional virtual environment. For ease of reading and discussion, the term "multi-dimensional virtual environment" will be shortened to "virtual environment" in most instances in the following discussion. In most, but not necessarily all embodiments, the virtual environments are three-dimensional virtual environments.

The information (transmitted to clients 106) describing the virtual environment includes information describing avatar objects representing the clients 106. The information describing the virtual environment includes room definitions, which are rendered by application 110 for rendering the virtual environment. Room definitions are further discussed with reference to FIG. 4.

The virtual environment server system 120 transmits to a client 104 with chat-only client 112 chat text received from other clients 104 and from clients 106 participating in the mutual communication session. In some embodiments, the virtual environment server system 120 also transmits to clients 104 information (e.g., text) describing the multi-dimensional virtual environment, including a description of avatar objects representing the clients 106. For example, in some embodiments the virtual environment server system 120 transmits to a respective client 104 text describing actions by one or more avatars in a respective virtual environment (i.e., the virtual environment in which the user of client 104 is participating as a chat-only participant). In another example, in some embodiments the virtual environment server system 120 transmits to a respective client 104 snapshots (i.e., images) of the respective virtual environment in which the user of client 104 is participating as a chat-only participant, for display at the client 104. Alternately, or in addition, the virtual environment server system 120 transmits to clients 104 some or all of the same virtual environment information that is sent to client 106, but this information may be largely or completely ignored by chat-only client application 112.

Communications network(s) 108 may include the Internet, and/or one or more local area networks and/or wide area networks, and need not be described in detail because such networks are well known to those of ordinary skill in the art.

Figure 2A:
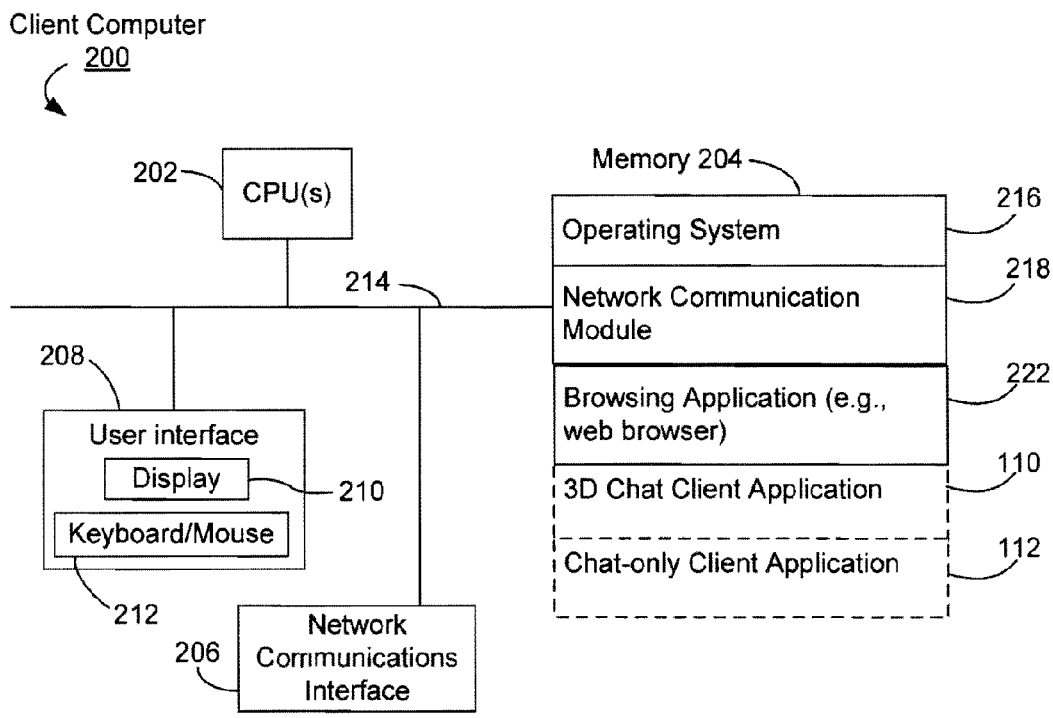
FIG. 2A is a block diagram illustrating an example of a client computer according to some embodiments of the invention.

FIG. 2A is a block diagram illustrating a client computer 200 in accordance with some embodiments. The client computer 200 typically includes one or more processing units (CPU's) 202, one or more network or other communications interfaces 206, memory 204, and one or more communication buses 214 for interconnecting these components. The communication buses 214 may include circuitry (sometimes called a chipset) that interconnects and controls communications between system components. The client computer 200 may also include a user interface 208, including a display device 210 and a keyboard and/or mouse (or other pointing device) 212. The user interface 208 may optionally include other I/O devices, such as a keyboard; alternately, the display device 210 may be a touch sensitive display which receives user input, such as commands, by sensing user contact with objects (e.g., keys on a virtual keyboard, or menu items, or other objects) displayed on the display device 208.

Memory 204 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 204 may optionally include one or more storage devices remotely located from the CPU(s) 202. In some embodiments, memory 204 stores the following programs, modules and data structures, or a subset thereof:

- an operating system 216 that includes procedures for handling various basic system services and for performing hardware dependent tasks;
- a network communication module 218 that is used for connecting the client system 200 to other computers via the one or more communication network interfaces 206 and one or more communication networks, such as the Internet, other wide area networks, local area networks, metropolitan area networks, and so on; and
- a browsing application 222, such as a web browser.

In some embodiments, memory 204 includes a 3D client application 110 for rendering multi-dimensional virtual environments. In some embodiments, memory 204 includes a chat-only client application 112.

In some embodiments, received content items may be cached locally in memory 204. Each of the above identified modules or programs in FIG. 2A may be stored in one or more of the previously mentioned memory devices that comprise memory 204. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 204 may store a subset of the modules and data structures identified above. Furthermore, memory 204 may store additional modules and data structures not described above.

Figure 2B:
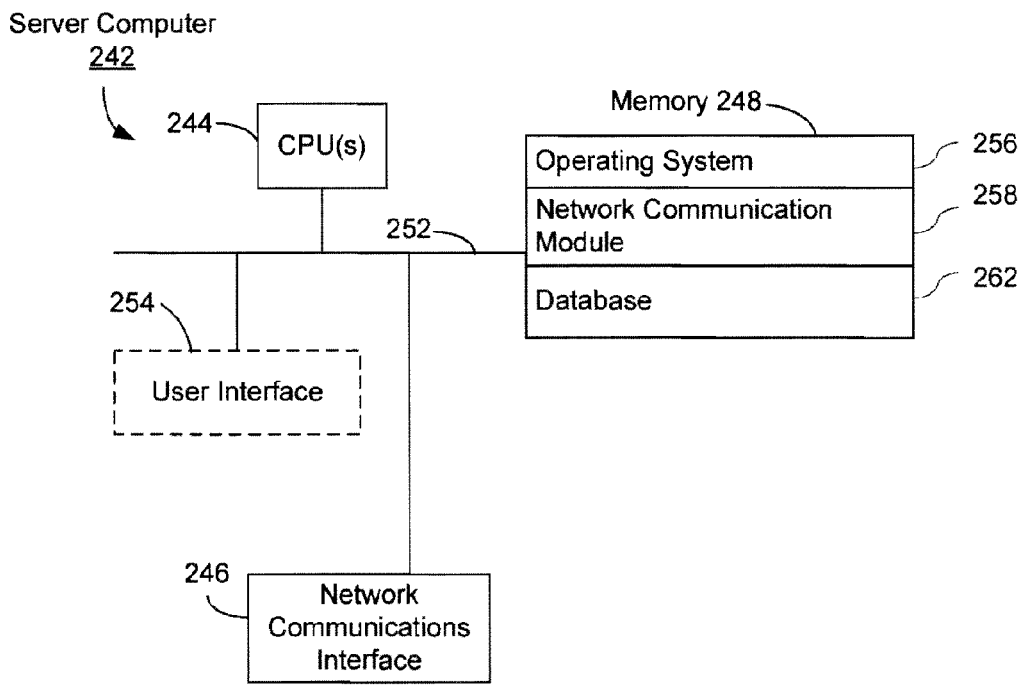
FIG. 2B is a block diagram illustrating an example of a server computer according to some embodiments of the invention.

FIG. 2B is a block diagram illustrating a server computer 242 in accordance with some embodiments. The server computer 242 typically includes one or more processing units (CPU's) 244, one or more network or other communications interfaces 246, memory 248, and one or more communication buses 252 for interconnecting these components. The communication buses 252 may include circuitry (sometimes called a chipset) that interconnects and controls communications between system components. The server system 242 optionally may include a user interface 254, which may include a display device (not shown), and a keyboard and/or a mouse (not shown).

Memory 248 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 248 may optionally include one or more storage devices remotely located from the CPU(s) 244. In some embodiments, memory 248 stores the following programs, modules and data structures, or a subset thereof:

- an operating system 256 that includes procedures for handling various basic system services and for performing hardware dependent tasks;
- a network communication module 258 that is used for connecting the server system 242 to other computers via the one or more communication network interfaces 246 and one or more communication networks, such as the Internet, other wide area networks, local area networks, metropolitan area networks, and so on;

one or more databases 252, such as chat database 155, user database 175 and/or room database 180 (FIG. 1); and one or more server applications 254, such an application for implementing the functions of the incoming chat server 135, logic 140, the outgoing chat server 150, delegate server 160, logic 165, storage server 170, or room server 190.

Each of the above identified programs, modules and data structures in FIG. 2B may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 248 may store a subset of the modules and data structures identified above. Furthermore, memory 248 may store additional modules and data structures not described above.

Although FIG. 2B shows a "server computer," FIG. 2B is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 2B could be implemented on single servers and single items could be implemented by one or more servers. The actual number of servers in the virtual environment server system 120 (FIG. 1) and how features are allocated among them will vary from one implementation to another, and may depend in part on the amount of information stored by the system and/or the amount data traffic that the system must handle during peak usage periods as well as during average usage periods.

Figure 3A:
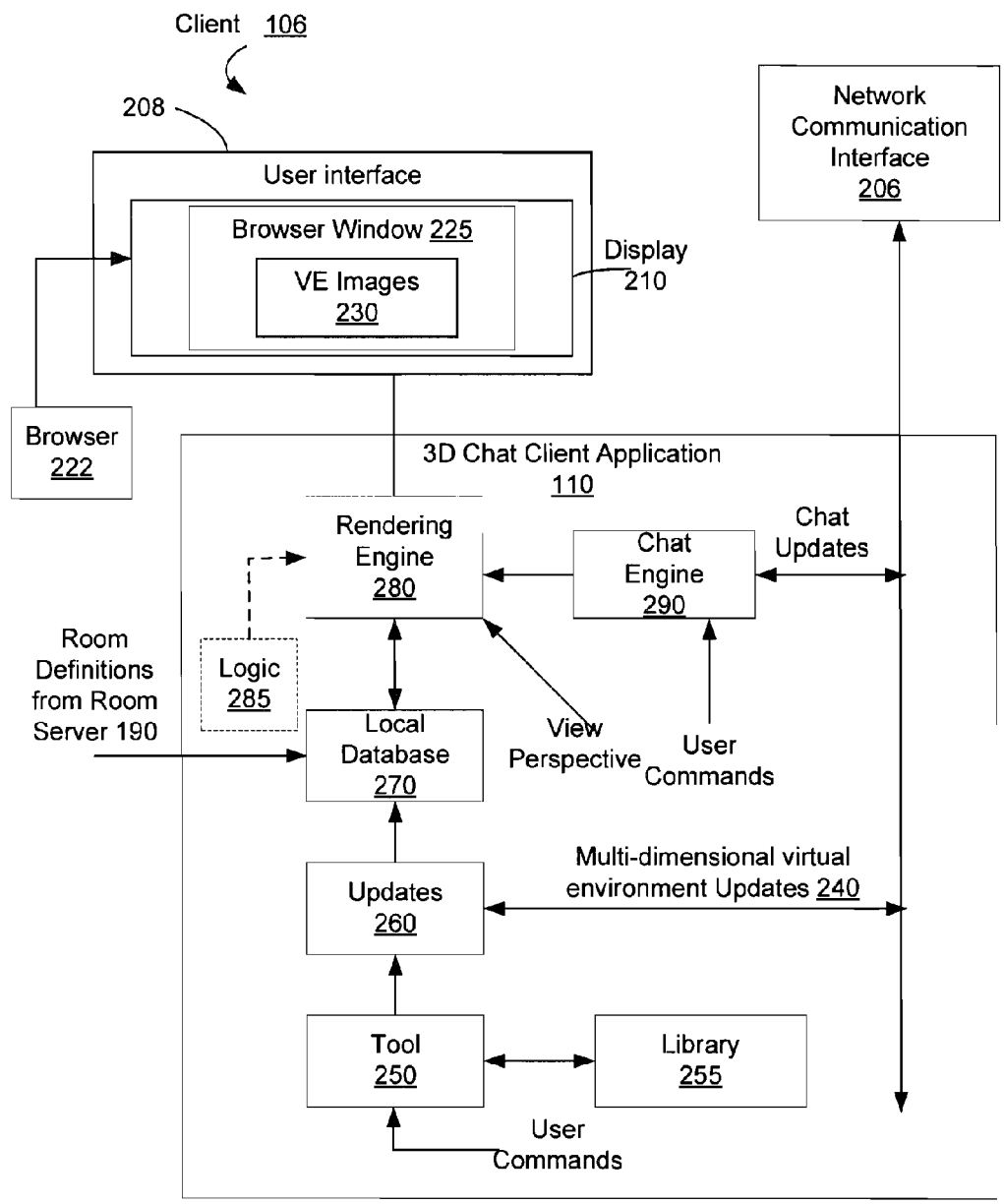
FIGS. 3A and 3B are block diagrams illustrating an example of client computers according to some embodiments of the invention.

FIG. 3A illustrates an embodiment of a client 106 having a 3D client application 110. Client 106 has a network communication interface 206 to interface with one or more networks 108. 3D client application 110 is used by a user of the client 106 to render a virtual environment (e.g., a three-dimension virtual environment) using a user interface 208. The user's participant in the virtual environment, which is referred to herein as an avatar or an avatar object, logically exists on the virtual environment server system 120.

The user interface 208 displays a view of the virtual environment, and the information regarding the user's avatar (e.g., commands for changing the avatar's position, or for invoking actions by the avatar) are sent back to the virtual environment server system 120 so that the virtual environment downloaded to each user (i.e., to the client used by each current participant of the virtual environment) can be updated with information about the location and movement of each user's avatar. In this way, users are kept current with the state of each user's avatar. Also, any user activities which affect the virtual environment from more than a local perspective are sent to the virtual environment server system 120. Changes in presence, location, and actions of the user's avatars and other user activities affecting the virtual environment are referred to as virtual environment updates 240 and are communicated to the virtual environment server system 120.

In some embodiments, 3D client application 110 includes a tool 250, which can be used by the user of client 106 to modify or specify the position of and actions performed by user's avatar and/or for authoring purposes (i.e., for modifying the virtual environment in which the user is currently a participant) using library 255. The user can use tool 250 to change characteristics, such as color and texture, of an object instance. The user can also create new instances of objects, from a library of objects, and can then modify the characteristics of those objects. Different users may have different levels of authority for creating and modifying objects within the context of a particular virtual environment.

All updates 260, whether due to changes in the user's avatar caused by the user, or whether received from the virtual environment server system 120, may be stored in a local database 270. Local database 270 also stores room definitions (i.e., virtual environment definitions) received from room server 190. In some embodiments, the local database 270 is a cache or volatile memory that stores the updates until the user's session is completed or until the client is powered off. In some embodiments, room updates are cached and sent to the room server 190 at periodic intervals, or after the user's session is completed. In other embodiments, the room updates are sent to the room server 190 upon the user performing an action with the 3D chat client application. In yet other embodiments, the room updates are immediately sent to the room server 190.

The updated object information and room definitions stored in local database 270 are rendered by rendering engine 280 in the user interface 208. The rendering engine 280 includes a command interpreter (not shown) and may perform the rendering based on a particular view or perspective of the virtual environment indicated by the user of client 106. The rendering engine 280 also receives chat streams and chat updates from chat engine 290, which may be a part of 3D client application 110 (as shown in FIG. 2) or may be a separate application. The chat engine 290 sends and receives chat updates from the virtual environment server system 120, and has a user interface to receive user commands and chat input.

As illustrated in FIG. 3A, in some embodiments, images (VE images) 230 of the virtual environment produced by the 3D client application 110 are displayed in a display 210 of the user interface 208. In some embodiments, the images 230 appear as being a part of a window 225 of a browser 222, such as a Web browser. The browser 222 creates a window for the rendering engine 280 to render into. Browser 222 may also be used for making HTTP requests to virtual environment server system 120 by client 106. The HTTP requests may, for instance, request updated data needed to keep the locally displayed images of a virtual environment up to date. In other embodiments, the client application 110 includes logic 285 to work with the browser 235 to cause the rendering engine 280 to render into a window to give the appearance that the window is part of a web page. Logic 285 may be a part of the rendering engine 280.

In some embodiments, the 3D client application 110 is a script-based module, embedded in a webpage served from the virtual environment server system 120 (FIG. 1). The webpage may be rendered by a browsing application 222, such as a web browser, at the client 106. When the webpage is rendered, the 3D client application 110 is executed, thereby providing a web-based interface to the server system 120. The script-based module may be written in JAVASCRIPT®, ECMASCRIPT, VBSCRIPTT™, or any other suitable scripting language.

In some other embodiments, the 3D client application 110 is a standalone application stored in memory 204 of the client computer 106. In further embodiments, the 3D client application 110 may be an add-on, extension or a plug-in to another application. For, example, the 3D client application 110 may be a plug-in or extension to a web browser application 222 or an email application. In further embodiments, the 3D client application 110 is an applet downloaded from a server over the Internet.

The client 106 sends chat stream updates to the virtual environment server system 120. The client 106 also sends avatar object updates, including changes to avatar presence, location/orientation, and actions, to the virtual environment server system 120. The client 106 may also send one or more snapshots of the multi-dimensional virtual environment being rendered at the client 106 to the virtual environment server system 120, as described in greater detail with reference to FIGS. 7 and 8. The client 106 receives chat stream and object updates from the virtual environment server system 120. These updates may be conveyed to the client 106 using either pull (i.e., client initiated) or push (i.e., server initiated) communication techniques.

Figure 3B:
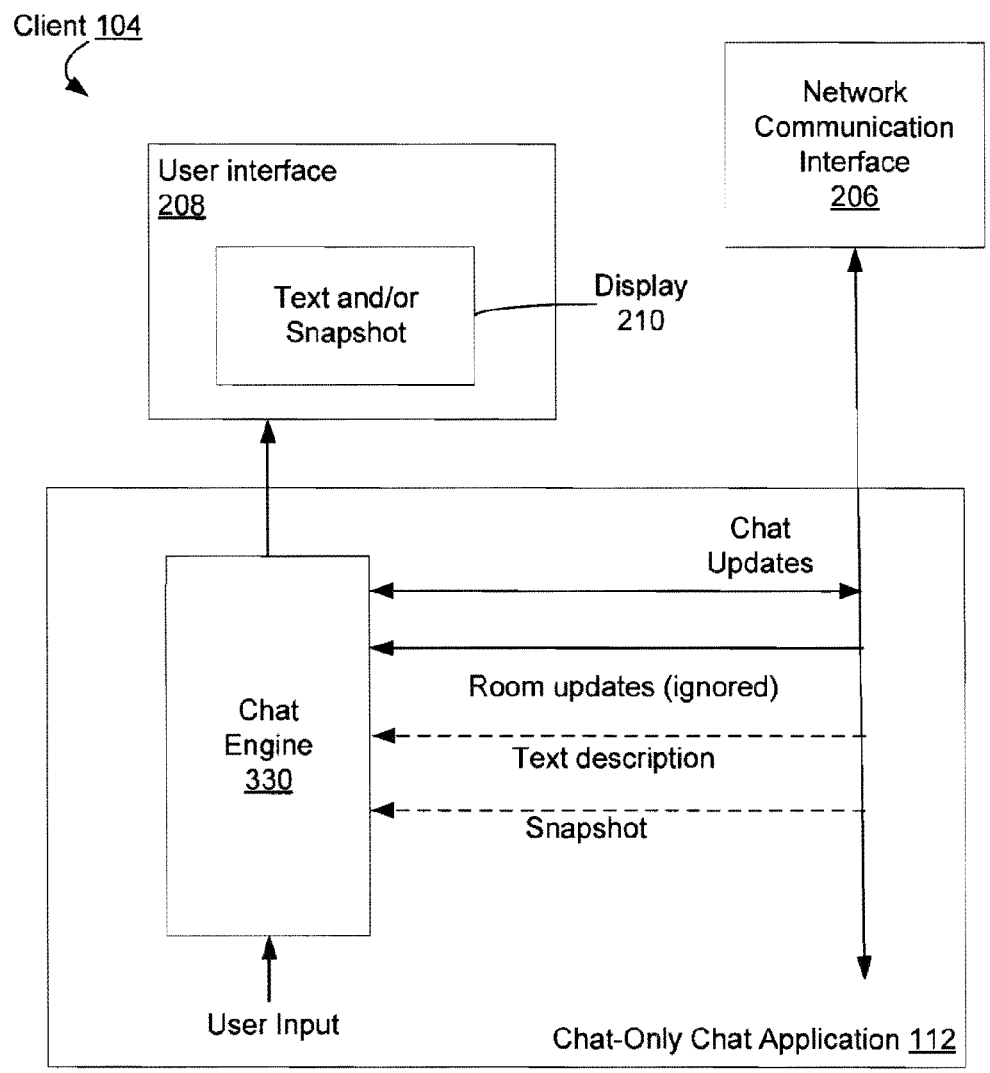

FIG. 3B illustrates an embodiment of a client 104 having a chat-only client application 112. Client 104 has a network communication interface 206 to interface with one or more networks 108. Chat-only client application 112 enables client 104 to engage in real-time text-based chat and instant messaging with another client 104 that also has chat-only client application 112. Chat-only client application 112 may also enable clients 104 to send voicemail and files to other clients. Chat-only client application 112 does not render multi-dimensional virtual environments. Chat-only client application 112 includes a chat engine 330 that includes a command interpreter (not shown) and renders information received from the virtual environment server system 120 and from user input in a display 210 of user interface 208.

The client 104 sends chat stream updates to the virtual environment server system 120. The client 104 also receives chat stream updates from the virtual environment server system 120. Further, in some embodiments, the client 104 receives object updates from the virtual environment server system 120. The chat-only client application 112 at the client 104 ignores object updates from the virtual environment server system 120. In some embodiments, the client 104 receives a text description of avatar objects present in a virtual environment, which may optionally include the location and/or orientation of the avatar objects, from the virtual environment server system 120, as described in greater detail with reference to FIG. 9. In some embodiments, the client 104 receives a snapshot of a virtual environment from the virtual environment server system 120, as described in greater detail with reference to FIGS. 7 and 8.

In some embodiments, the chat-only client application 112 is a script-based module, embedded in a webpage served from the virtual environment server system 120 (FIG. 1). The webpage may be rendered by a browsing application 222, such as a web browser, at the client computer 104. When the webpage is rendered, the chat-only client application 112 is executed, thereby providing a web-based interface to the server system 120. The script-based module may be written in JAVASCRIPT®, ECMASCRIPT, VBSCRIPTT™, or any other suitable scripting language.

In some other embodiments, the chat-only client application 112 is a standalone application stored in memory 204 of the client computer 104. In further embodiments, the chat-only client application 112 may be an add-on or a plug-in to another application. For, example, the chat-only client application 112 may be a plug-in or extension to a web browser application 222 or an email application. In further embodiments, the chat-only client application 112 is an applet downloaded from a server over the Internet.

In the embodiment illustrated in FIG. 3B, the chat-only client application 112 also receives avatar updates and virtual environment status from the virtual environment server system 120 via the network interface 310. In some embodiments, this information is in the form of text description. In the alternative, or in addition, the client 104 receives one or more snapshots of a multi-dimensional virtual environment, which are then displayed by the client 104 (e.g., in a window of the chat-only client application 112, or in a window of a client application, such as a browser application). In this way, the client 104 can get an idea of what is happening in the multi-dimensional virtual environment and may be enticed to download or otherwise obtain the 3D client application 110 in order to be able to render the multi-dimensional virtual environment.

Referring to FIG. 1, in order to render a multi-dimensional virtual environment, client 106 sends an HTTP request to the virtual environment server system 120 requesting a "room definition" associated with a multi-dimensional virtual environment. The virtual environment server system 120 stores room definitions for all multi-dimensional virtual environments that logically exist on the virtual environment server system 120 in the room database 180 (FIG. 1).

Figure 4:
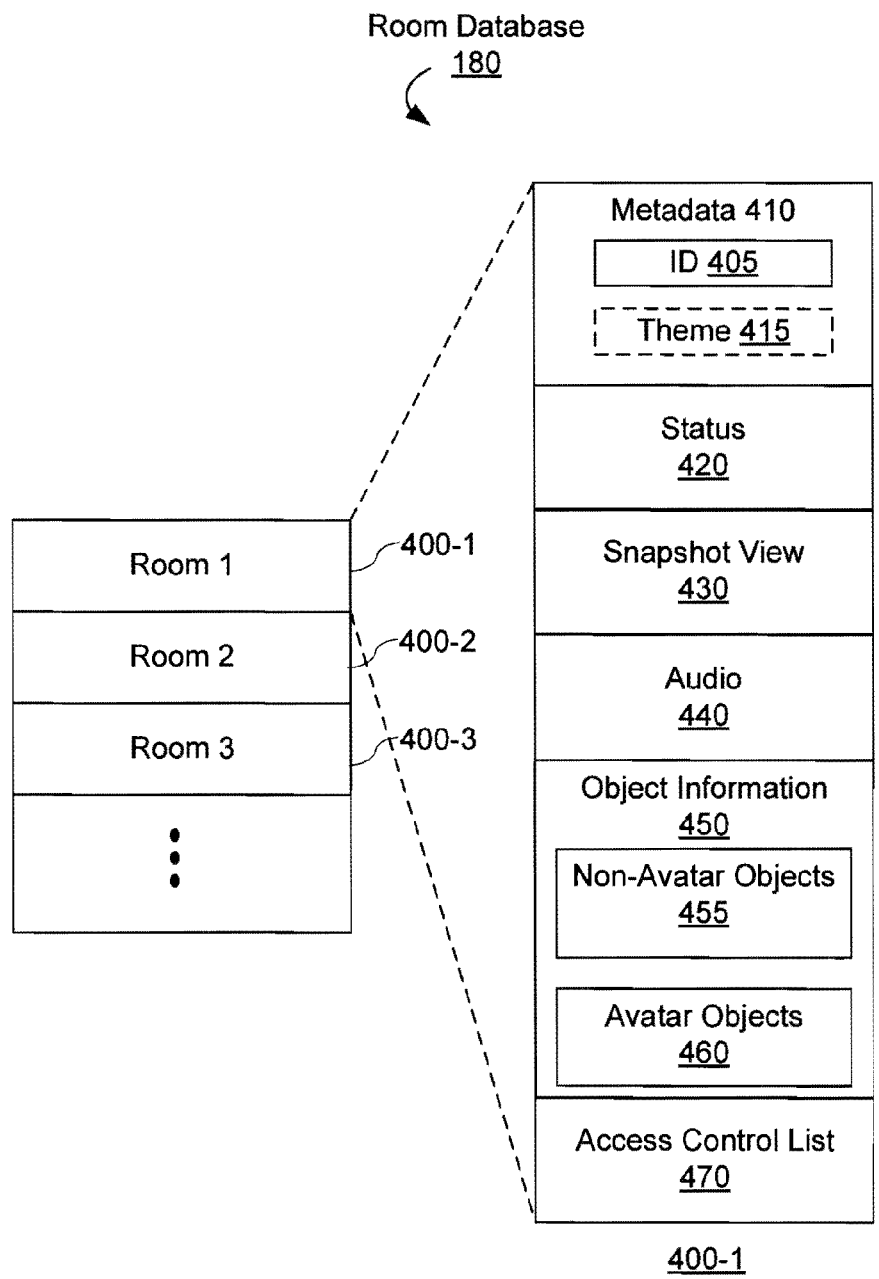
FIG. 4 is a block diagram illustrating an example of stored room definitions according to some embodiments of the invention.

FIG. 4 illustrates a room database 180 having a plurality of room definitions 400, each storing the information needed to reproduce a respective multi-dimensional virtual environment, according to some embodiments of the invention. In some embodiments, the room database is stored in a storage server 170 of the virtual environment server system 120. Furthermore, the room definition 400 of a respective virtual environment, or a portion of that room definition, is downloaded to a client 110 when a user of the client 110 enters the virtual environment. The room definition data downloaded to the client 110 enables that client to render the virtual environment on the user interface of the client 110.

For each virtual environment that logically exists at the virtual environment server system 120, a respective room definition 400 stores some or all of the following information: metadata 410, status information 420, an optional snapshot view of the multi-dimensional virtual environment 430, audio information 440, room object information 450, and an access control list ("ACL") 470. In some embodiments, a respective room definition 400 may also include other information, supporting additional features or options not discussed here.

Metadata 410 optionally includes a unique identifier 405 associated with the multi-dimensional virtual environment. Metadata 410 may optionally include one or more themes or descriptions 415 associated with the virtual environment. The status information 420 indicates whether the virtual environment contains active users or is idle. The status information 420 may also include information associated with a current state of objects 455 and 460 present in the multi-dimensional virtual environment. The current state may include the current position of an object and/or a current activity associated with the object. Snapshot view 430 stores a current (or most recent) snapshot of the virtual environment. Audio information 440 may include ambient sound of the multi-dimensional virtual environment. Audio information 440 may also include sounds associated with actions performed by and/or behaviors associated with objects in the multi-dimensional virtual environment. In some embodiments, a room definition 400 includes a list of all the objects in the room. Object information 450 stores an inventory of non-avatar objects 455 and avatar objects 460 present in the multi-dimensional virtual environment. Object information 450 is discussed further in reference to FIG. 5.

The ACL 470 indicates which users have what type of access to the multi-dimensional virtual environment. The types of access to the virtual environment may include a no-access mode, a read/look-only mode, a mode in which a user can read/look-only without user presence being known to other users in the virtual environment, and one or more modes in which users can participate in the virtual environment, including being able to modify one or more aspects of the multi-dimensional virtual environment. In some embodiments, social network information is used to determine a user's level of access to a corresponding virtual environment. Accordingly, a user within a social network may have access to a virtual environment associated with particular groups within the social network. Alternately, the amount of access that user has within a social network may depend on the amount of access the user has to a virtual environment that corresponds to or is associated with the social network. Additionally, or in the alternative, the amount of access that a user has within a social network may depend on how closely related the user is to a user of the corresponding or associated virtual environment, which may be measured by one or more appropriate metrics. For instance, closeness between a user of a social network and a user of a virtual environment may be measured in terms of degrees of separation between the two users, or it may be measured in terms of the number of factors (of a predefined set of factors) whose values are identical or otherwise indicate that the two users are the same person or are authorized to act on behalf of each other.

In some embodiments, a room is transmitted using a sequence of HTTP requests. For example, the audio data 440 is transmitted separately from the room definition 180, and the objects 450 referred to in the room definition 180 are also transmitted separately.

Figure 5:
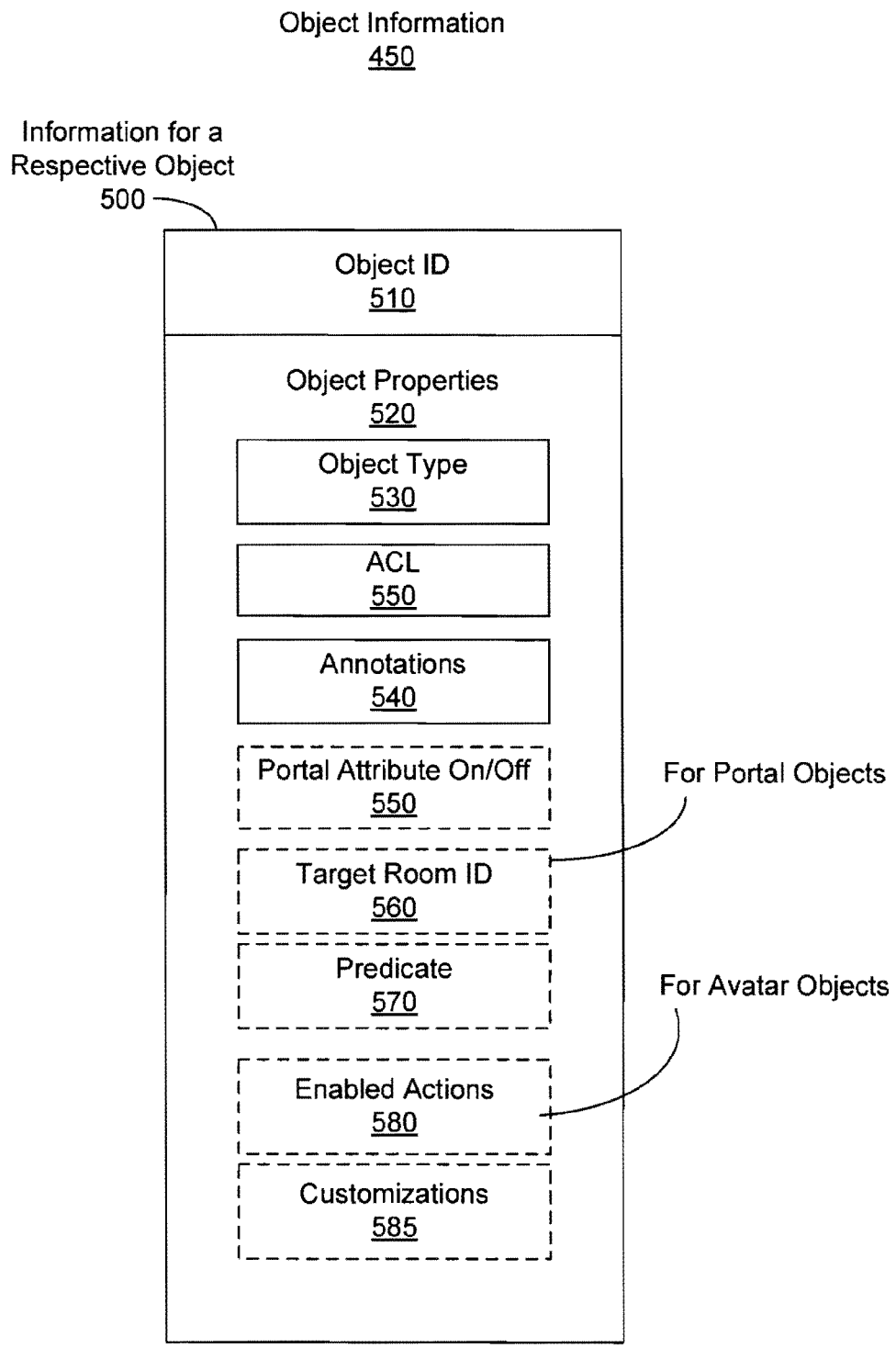
FIG. 5 is a block diagram illustrating an example of stored object information according to some embodiments of the invention.

FIG. 5 illustrates an embodiment of object information 450 for an object 500 that can be stored in the room database 180. As discussed, the user can create multiple objects. Each object is an instance of a respective object type, and therefore objects are sometimes called object instances. Each object instance in a virtual environment is saved separately in the object information 450 of a room definition 400. In some embodiments, the object information 500 for a respective object includes an object identifier 510 and object properties 520. The object identifier 510 uniquely identifies object instance 500. Object properties 520 include object type 530, an access control list 550, and annotations 540. Object type 530 identifies one or more types or categories to which the object 500 belongs. Annotations 540 are supplemental text or other information associated with the object 500. Annotations 540 may be specified by one or more users of a virtual environment. Annotations are further discussed in reference with FIGS. 12 and 13.

Certain objects, herein called portal objects, function as portals between virtual environments. For example, a particular portal object may function as a portal from a first virtual environment to a second virtual environment. Portal objects enable a user's avatar to move from one virtual environment to another. Portal objects are further discussed in reference with FIGS. 10 and 11. In some embodiments, all three-dimensional non-avatar objects can function as portals. In some embodiments, for objects that can function as a portal, object information 500 can store a portal status indicator 550 that indicates whether a portal attribute is on or off. Alternately, in some embodiments the object information 500 for a respective object includes a portal status indicator 550 only if the object is a portal object. When the portal attribute 550 of an object is on, the object is functioning as a portal from a first virtual environment to a second virtual environment. When the portal attribute 500 is on, object information 500 typically also includes an identifier 560 or a location or addressing information for the second virtual environment (i.e., for the target virtual environment of the portal object). Further, object information 500 for a portal object can further include a predicate 570, the occurrence of which causes the portal object to transport a user (i.e., a user's avatar) from the first virtual environment to the second virtual environment.

In some embodiments, avatar objects may have additional data associated with them for storage as object information 500. As illustrated in FIG. 5, object information 500 for an avatar object may include actions 580 that are enabled for the object 500, and user customizations 585 that the user has performed on the object 500.

Figure 6:
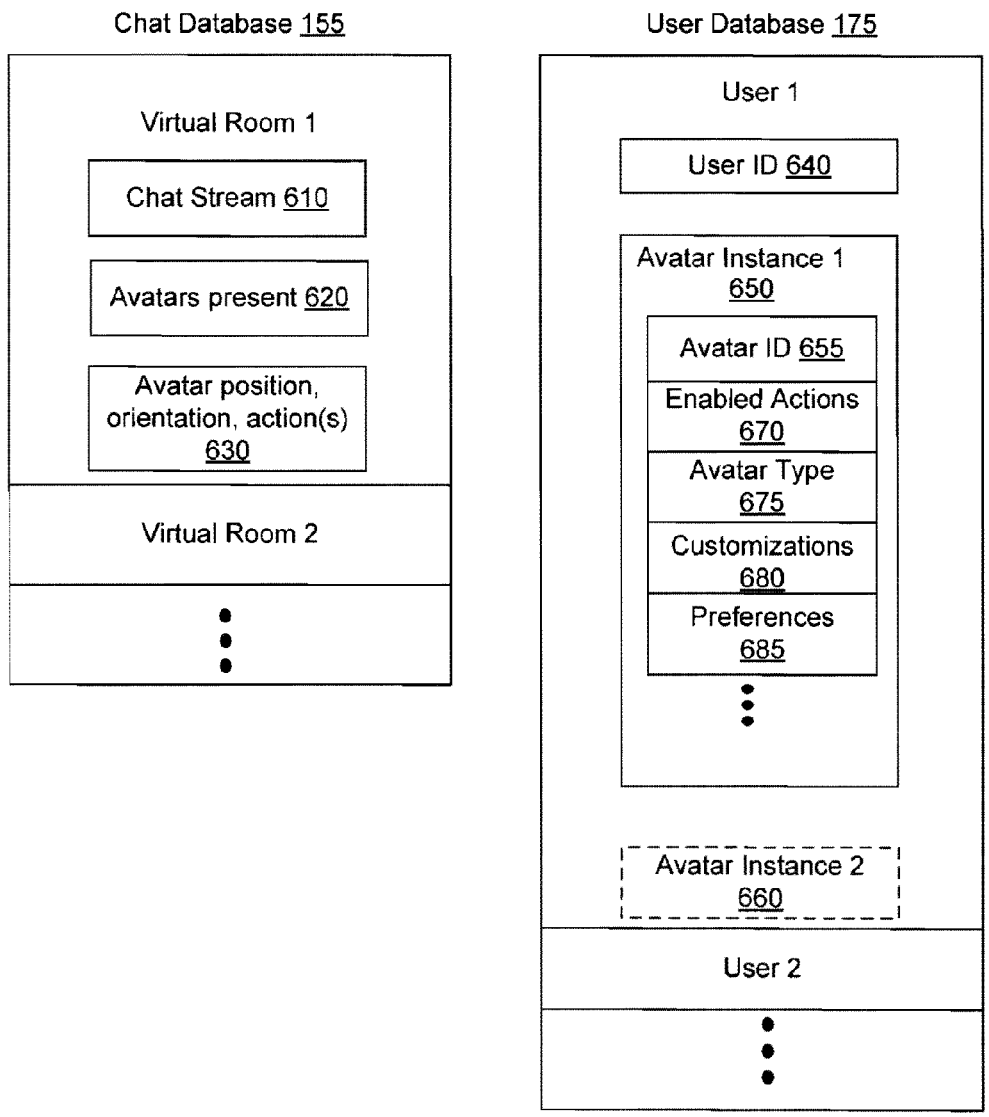
FIG. 6 is a block diagram illustrating an example of a chat database and a user database according to some embodiments of the invention.

Referring to FIG. 1, the virtual environments server system 120 stores chat information associated with each multi-dimensional virtual environment that logically exists on the virtual environment server system 120 in a chat database 155. FIG. 6 illustrates an embodiment of a chat database 155. FIG. 6 also illustrates an embodiment of a user database 175 that stores user information associated with each user of the virtual environment server system 120.

For each multi-dimensional virtual environment, the chat database 155 stores chat stream data 610. In some embodiments, the amount of storage provided for storing the chat stream 610 is limited such that only the last few chat text exchanges are stored. For example, in some embodiments, the ten most current chat text messages are stored for each virtual environment. The chat database 155 stores information about what avatar objects 620 are present in the multi-dimensional virtual environment. For each avatar object present in the room, the chat database 155 stores information 630 about the current position of the avatar, the current orientation of the avatar and the most recent action (e.g., an action such as walking, waving a hand, or dancing, etc.) being performed by the avatar. In some embodiments, the avatar presence information 620 and the avatar position and action information 630 for a particular avatar is removed from the chat database 155 once an avatar exits the multi-dimensional virtual environment. In some embodiments, no records are retained concerning chat streams (except possibly the last few chat messages) and avatar presence, position and actions with respect to past conversations and past visits by an avatar.

The user database 175 is a user's inventory of avatar instances. Users of clients 106 can store different looks for respective avatars, as different instances. For each user, the user database may store an identifier 640 and an avatar object instance 650. Avatar object instance 650 is a first instance of an avatar object associated with the user. Related with avatar object instance 650, the user database 175 may store an avatar identifier 655, enabled actions 670 for the avatar object instance 650, avatar type 675, user customizations 680, and user preferences 685. The avatar identifier 655 uniquely identifies the avatar instance 655. In some embodiments, the avatar identifier 660 is mapped to the user identifier 640. User customizations 680 are things that can customize an avatar's appearance and/or enabled actions. The user database 175 may also store metadata, such as user preferences 685. For instance, the user preferences 685 may include a value that indicates the user's preferred language. The user database 175 may also store additional avatar instances, such as a second avatar object instance 660, and additional avatar object instances, if they exist. In some embodiments, the user database 175 is a persistent data structure.

As discussed, the client 104 does not have a 3D chat client application 110 and therefore cannot render a multi-dimensional virtual environment. However, the client 104 may participate in a communication session with one or more clients 706 having respective 3D chat client applications 110 and/or one or more other clients 104. In some embodiments, the client 104 may receive one or more snapshots of the multi-dimensional virtual environment that is being rendered at clients 106 who are participating in the same virtual environment. In this way, a user of the client 104 can participate in the chat aspect of the virtual environment and can also receive partial information regarding the other aspects (e.g., visual aspects, avatar actions, etc) of what is happening in the multi-dimensional virtual environment.

Figure 7A:
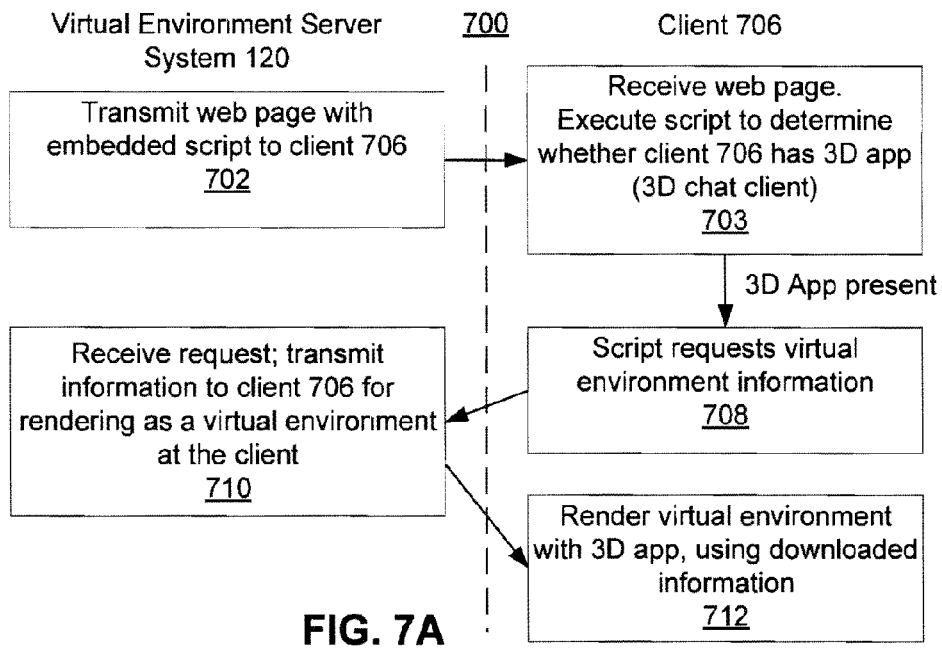
FIG. 7A is a flow chart of a process for downloading virtual environment information to a client for rendering using a 3D chat client application, according to some embodiments of the invention.
Figure 7B:
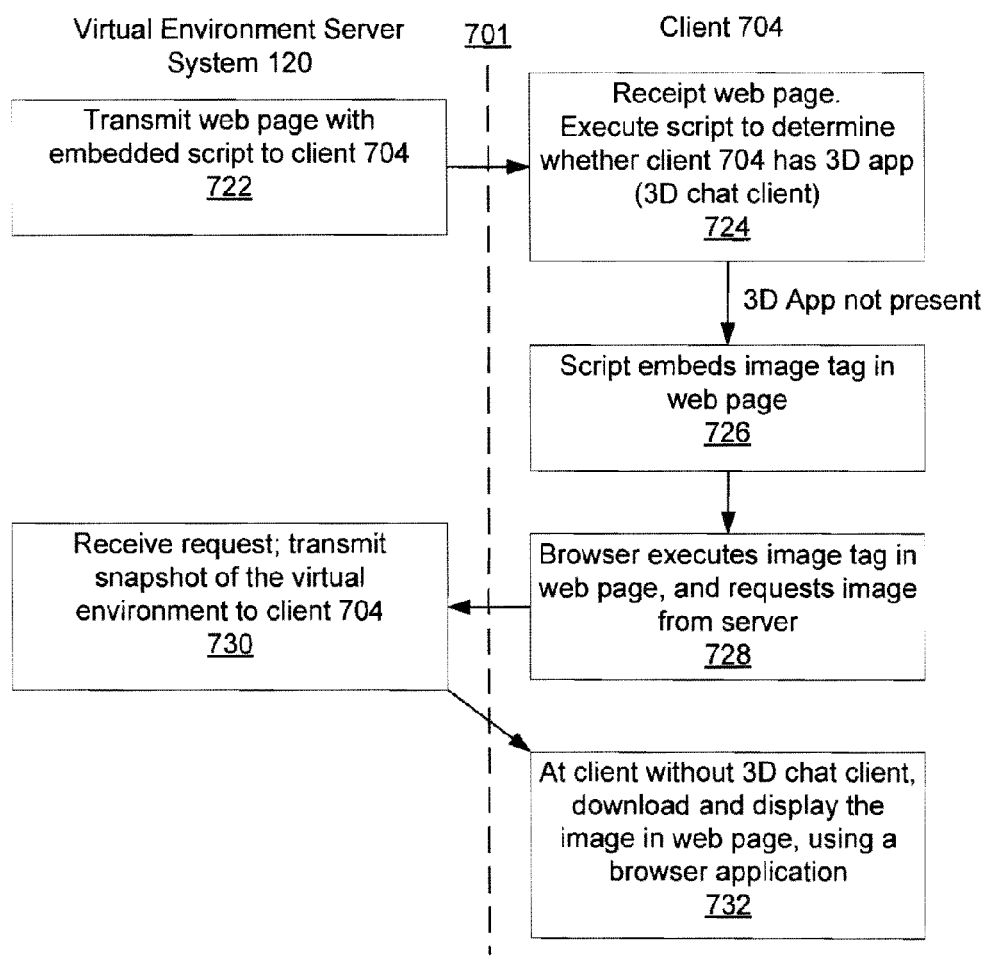
FIG. 7B is a flow chart of a process for displaying a snapshot of a multi-dimensional virtual environment at a client according to some embodiments of the invention.
Figure 8:
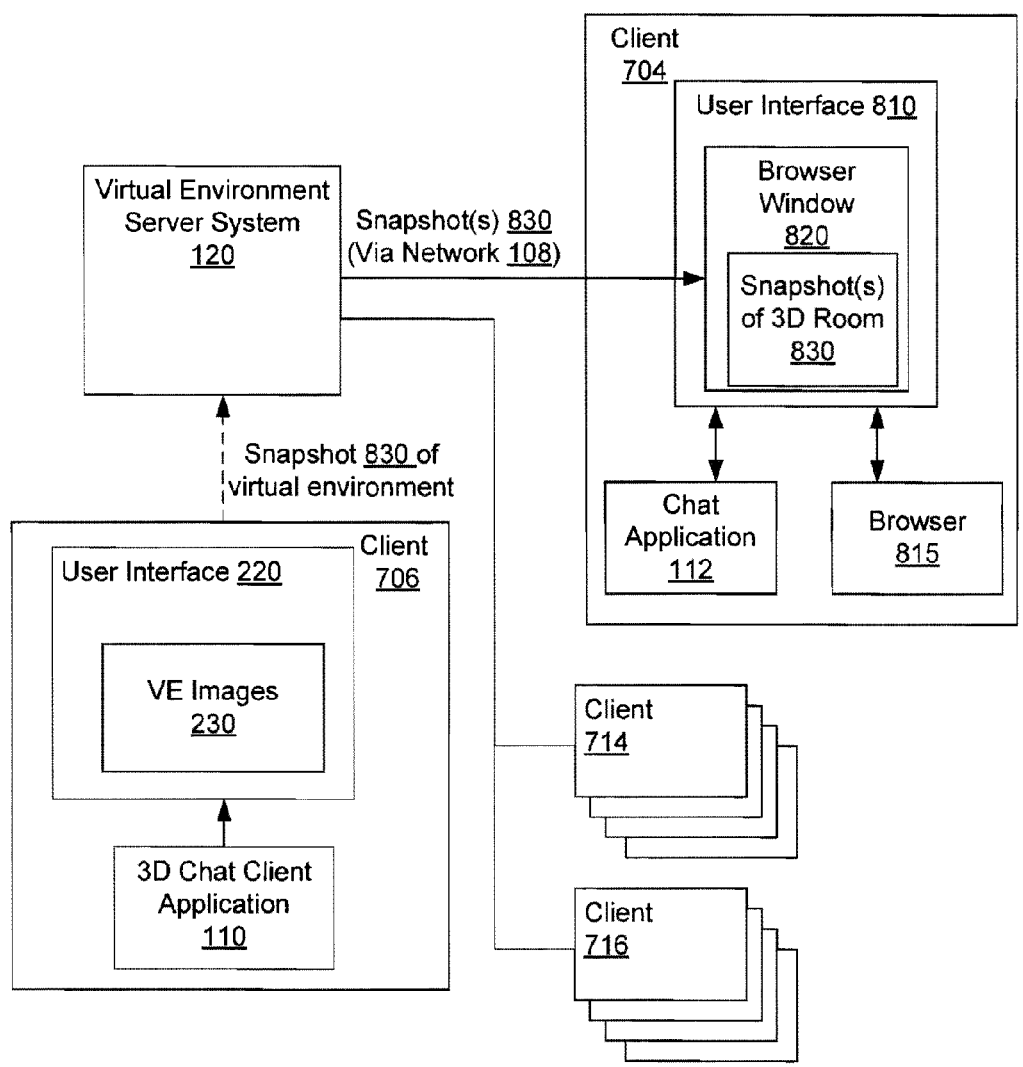
FIG. 8 is a block diagram illustrating an example of a system for displaying a snapshot of a multi-dimensional virtual environment at one client, while another client renders the virtual environment using a 3D chat client application, according to some embodiments of the invention.

FIGS. 7B and 8 illustrate an embodiment of a method 701 and system 800, respectively, to transmit a snapshot of a multi-dimensional virtual environment to a client 704 with a chat-only client application 112, while FIGS. 7A and 8 illustrate an embodiment of a method 700 and system 800 for transmitting virtual environment information to a client 706 having a 3D chat client application 110. Both methods, 700, 701 begin with a respective client sending an HTTP request (not shown) to the virtual environment server system 120, specifying a virtual environment (also called a room, virtual room, 3D chat room, etc.). The HTTP request from the client 704 or 706 initiates a process that enables the client's user to participate in the virtual environment, using either a 3D chat client application 110 or a chat-only application 112. The aforementioned HTTP request is typically sent by a browser application at the client 704 or 706 in response to (A) the client's user clicking on (i.e., selecting, or activating) a link in a web page, email message, chat conversation, or other document, or (B) the client's user selecting a bookmark for the specified virtual environment, or (C) execution of a script in a web page by the client's web browser, or (D) the client's user completing an online form for selecting a virtual environment. Other methods of initiating the sending of an HTTP request to the virtual environment server system 120 may be used as well.

After a respective client 704 or 706 has received the virtual environment information for local display, the clients remains in a communication session with other clients (whose users are participating in the same virtual environment), such as one or more clients 716 having respective 3D chat client applications 110 and/or one or more other clients 714 with respective chat-only client applications 112. The virtual environment server system 120 exchanges information with clients 704, 706, 714, 716 (FIG. 8).

In method 700 (FIG. 7A), the virtual environment server system 120 transmits (702) a web page with an embedded script to client 706 (see FIG. 8) in response to an HTTP request (as discussed above). In some embodiments, room server 702 transmits the web page. The client 706 receives the web page 706 and executes the embedded script (703), which determines whether or not the client 706 has a functional (i.e., installed, executable) copy of the 3D chat client application. In this example, the client does have a functional copy of the 3D chat client application, and the embedded script sends a request for virtual environment information to the virtual environment server system 120 (708). The server receives the request and transmits the requested virtual environment information to client 706 (710) for rendering at the client by the 3D chat client application (712). In some embodiments, storage server 170 transmits the requested virtual environment information to client 706.

In some embodiments, the transmitted virtual environment information is the information needed to populate the local database 270 (FIG. 3A) with all the information needed to render the specified virtual environment. In some embodiments, this information is transmitted from the server system 120 to the client 706 using multiple requests and data transmissions. For example, an initial set of object information may be transmitted, causing the 3D chat client application to request additional information about the objects in the virtual environment. This methodology avoids retransmission of any unexpired or valid information already present in the local database 270 of the client, thereby reducing latency (from first request to complete rendering of the virtual environment at the client) and bandwidth usage.

In method 701 (FIG. 7B), the virtual environment server system 120 transmits (722) a web page with an embedded script to client 704 (see FIG. 8) in response to an HTTP request (as discussed above). In some embodiments, room server 702 transmits the web page. The client 704 receives the web page and executes the embedded script (724), which determines whether or not the client 704 has a functional (i.e., installed, executable) copy of the 3D chat client application. In this example, the client 704 does not have a functional copy of the 3D chat client application, and therefore the script embeds an image tag in the web page (726). In some embodiments, the embedded image tag points to a location in or associated with the server system 120. When the browser application 815 of client 704 attempts to render the image tag, it requests an image from the server system 120 (728). For example, the request may be an HTTP request sent by the browser application 815, the HTTP request corresponding to the image tag inserted into the web page by the script embedded in the web page. The server system 120 responds to the request by sending to the client 704 a snapshot 830 (also called a snapshot image) of the virtual environment specified in the initial request from the client 704 to the server system 120 (730), which is then displayed at the client 704 (732), using a browser application 815 or other application capable of displaying the transmitted snapshot. In some embodiments, snapshot data 830 is stored in room database 180 and served to browser application 815 by room server 190. In some embodiments, the snapshot image 830 transmitted to client 704 includes a representation of the multi-dimensional virtual environment 230 rendered at a respective client 706. In some embodiments, the snapshot image 830 was previously generated by the client 706. In other embodiments, however, the snapshot image 830 is generated at the virtual environment server system 120, for instance by the room server 190. In some embodiments, the snapshot image 830 is stored in the room database 180 as a snapshot view 430, as described in reference to FIG. 4, and the snapshot view 430 is used as the source of the image 830 that is transmitted (730) to the client 704. In some embodiments, the snapshot image 830 is served by room server 190.

In some embodiments, the virtual environment server system 120 transmits a sequence of images to the client 704. The sequence of images 730 include multiple representations of a respective multi-dimensional virtual environment rendered at client 706 over a period of time (e.g., one image every N seconds or every N minutes). In some embodiments, the browser application 815 re-invokes the image tag at a predefined rate (e.g., a rate specified by a parameter or script in the web page being rendered by the browser application 815). In some embodiments, the images displayed at client 704 give the appearance of a web-cam that shows the current state of a respective virtual environment.

In some further embodiments, the virtual environment server system 120 transmits a sequence of images to the client 704 unless a predefined condition exists. For instance, in some embodiments, only a predefined number of images may be sent to the client 704.

The image and/or sequence of images 730 can be used to present a client 704 with a snapshot of a multi-dimensional virtual environment. This may then entice the client 704 to obtain 3D client application 110 so that the client 704 can navigate or participate in the multi-dimensional virtual environment.

Figure 9:
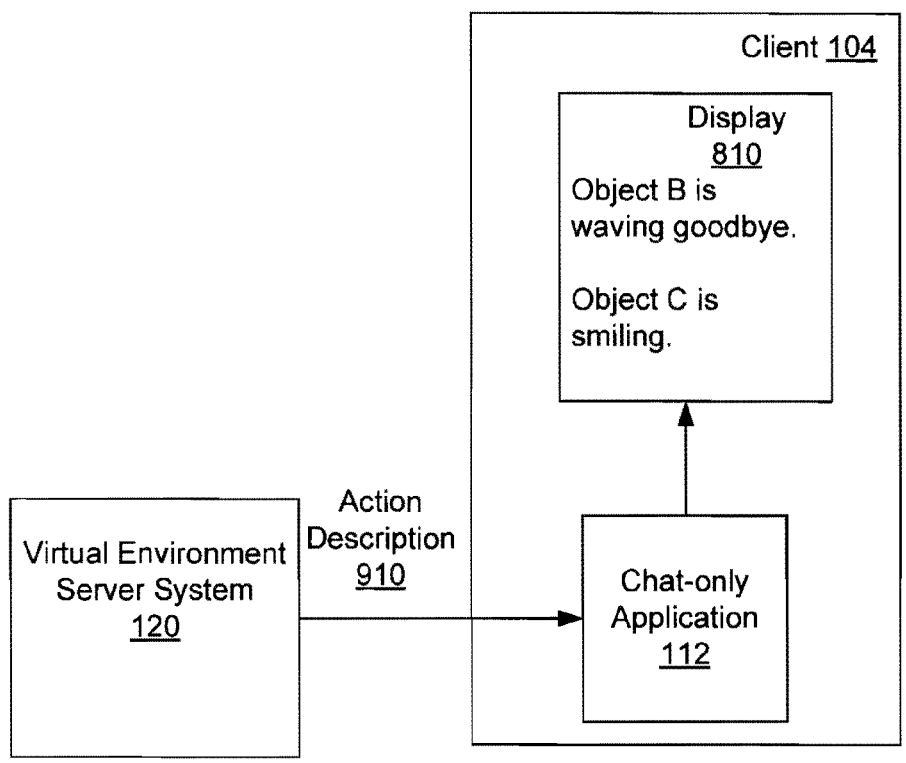
FIG. 9 is a block diagram illustrating an example of a system for displaying a text description of a multi-dimensional virtual environment at a client according to some embodiments of the invention.

In addition to, or in the alternative, enabling display of one or more snapshots 830 of a multi-dimensional virtual environment at a client 704 lacking a 3D client application 112, the virtual environment server system 120 enables display of text describing actions 910 being performed by avatar objects present in the multi-dimensional virtual environment at client 704, as illustrated in the system 900 of FIG. 9. The text 910 is rendered by chat-only client application 112 in a manner similar to chat stream data received from the virtual environment server system 120. The text 910 is displayed on a user interface (such as, display) 810 associated with the client 704, for instance, in-line with the chat text of the virtual environment.

Figure 10:
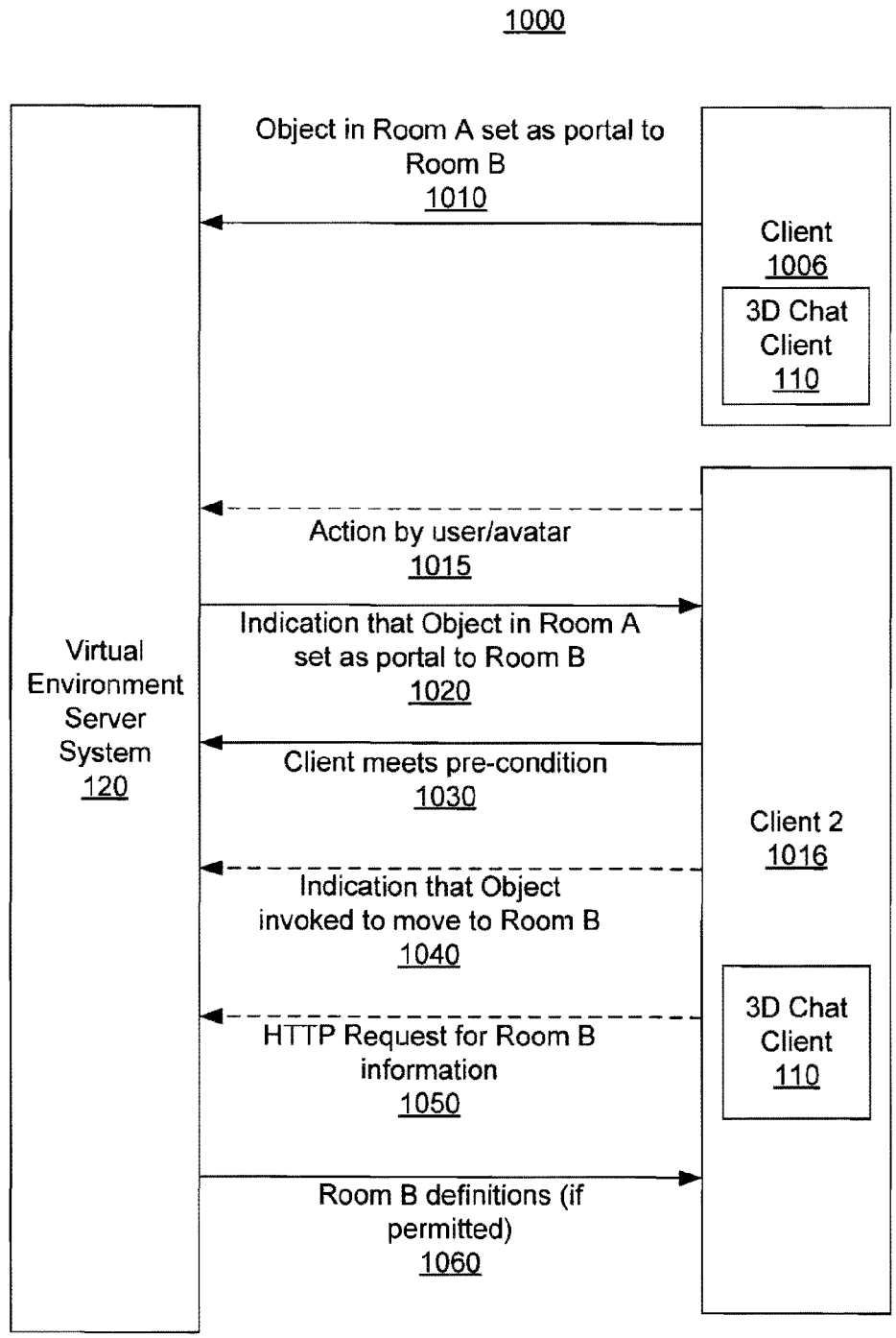
FIG. 10 is a block diagram illustrating an example of a system for establishing a portal from one multi-dimensional virtual environment to another according to some embodiments of the invention.

Once participating in a first multi-dimensional virtual environment, a client 106 may want to enter into a second multi-dimensional virtual environment. FIG. 10 illustrates a process 1000 of a client having a 3D client application 110, using a portal from a first virtual environment to a second virtual environment according to some embodiments of the invention.

As shown in FIG. 10, a client 1006 having a 3D client application 110 is participating in a first multi-dimensional virtual environment (referred to as "Room A" in FIG. 10) with a client 1016, also having a 3D client application 110. The client 1006 sets the portal attribute of an object in the multi-dimensional virtual environment (1010), causing the object to become a portal to a second multi-dimensional virtual environment, referred to as "Room B" in FIG. 10. For example, the value of the portal attribute of the object is changed from a first predefined value (e.g., "off" or 0) to a second predefined value (e.g., "on" or 1), or alternately a portal attribute is added to the definition of the object (which previously did not have a portal attribute). In some embodiments, the portal attribute includes, or is associated with, an identifier of the second multi-dimensional virtual environment. In some embodiments, the client 1006 specifies an identifier (e.g., name, location or address information) for the second multi-dimensional virtual environment (referred to as "Room B" in FIG. 10) when setting the portal attribute of the object. The identifier of the second multi-dimensional virtual environment can be room identifier 405 (FIG. 4), and/or a URL for the second multi-dimensional virtual environment.

Upon activation of the portal attribute of the object (1020), an indication that the object now functions as a portal is provided to the client 1016. In some embodiments, the indication is provided in response to one or more actions 1015 by client's 1016 user or avatar, such as the user using their mouse to hover over the object. For instance, the indication is provided in response to client's 1016 avatar or the user's cursor coming in proximity to the object that now functions as a portal. Alternately, whenever the metadata associated with any object in a virtual environment is modified, the updated metadata is transmitted to the clients of the current participants of the virtual environment (or at least to those clients that have the 3D client application).

Figure 11:
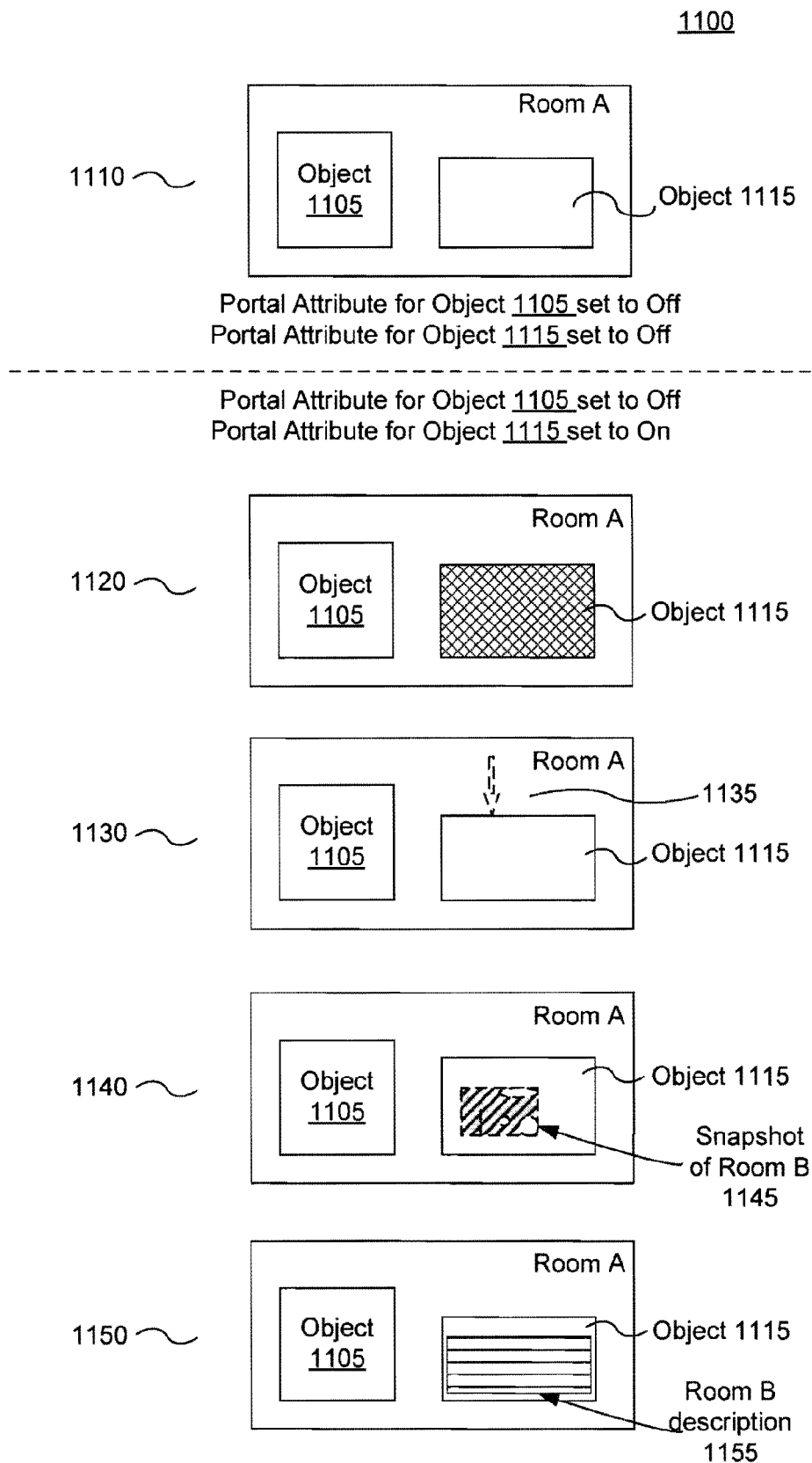
FIG. 11 is a figure illustrating examples of indications of a portal from one multi-dimensional virtual environment to another according to some embodiments of the invention.

FIG. 11 illustrates several embodiments, each of which displays different indications of an object functioning as a portal. Scenario 1110 illustrates a first virtual environment (Room A) having two objects 1105 and 1115, the respective portal attributes for which are set to Off (or, alternately, which do not have portal attributes). Scenarios 1120, 1130, 1140 and 1150 illustrate the first virtual environment (Room A), but object 1115 now functions as a portal to a second virtual environment (Room B) while non-portal object 1105 remains the same as in scenario 1110. In scenario 1120, portal object 1115 is highlighted or shaded to provide a visual indication that objection 1115 is a portal object. In scenario 1130, portal 1115 is being pointed to by an arrow or other indicator 1135 to provide a visual indication that objection 1115 is a portal object. In scenario 1140, portal object 1115 displays a snapshot image 1145 or a sequence of images 1145 of the second virtual environment (Room B) to provide a visual indication that objection 1115 is a portal object. In scenario 1150, portal object 1115 displays description 1155 of the second virtual environment (Room B) to provide a visual indication that objection 1115 is a portal object. A combination of two or more of scenarios 1120-1150 may also be used to indicate that object 1115 functions as a portal to the second virtual environment (Room B).

In some embodiments, object 1115 provides client 1016 with information about the content or type of virtual environment of second virtual environment (Room B). For instance, if object 1115 is a fireplace (of includes an image of a fireplace), then it may provide the user of client 1016 with an idea that the second virtual environment (Room B) is a fiery place.

Referring again to FIG. 10, at 1030, if the client 1016 meets one or more pre-conditions (1030), client 1016 is enabled to invoke the portal object to exit the first virtual environment (Room A) and enter the second virtual environment (Room B). A pre-condition can be the entering of a correct password, being within a certain radius or proximity of the portal object, the client or the avatar of the client 1016 performing a pre-defined action (e.g., clicking the portal object using a cursor), and/or an avatar of the client 1016 being in possession of an object (e.g., a key). Further, in some environments, client 1016 must have permission to at least view the second virtual environment (Room B), as specified in the ACL 470 (if any) of the second virtual environment (Room B).

At 1040, the virtual environment server system 120 receives an indication that client 1016 has invoked portal object to be transported to the second virtual environment (Room B). The indication is received upon the portal object being invoked by the client 1016. Alternatively, or in addition, at 1050, the virtual environment server system 120 receives an HTTP request from client 1016 for room definitions associated with the second virtual environment (Room B).

In response to the indication that client 1016 has invoked portal object and/or the HTTP request from client 1016, at 1060, the virtual environment server system 120 transmits room definitions associated with the second virtual environment (Room B). The second virtual environment (Room B) is then rendered at client 1016 using 3D client application 110. However, in some embodiments, upon receiving from a third client data indicating that the third client has invoked the portal object, the server prevents the third client from participating in the second virtual environment (Room B) if the third client is not authorized to participate in the second virtual environment (e.g., if the third client is not listed in the ACL 470 of Room B, or is excluded from participation in accordance with information in the ACL 470 of Room B).

Figure 12:
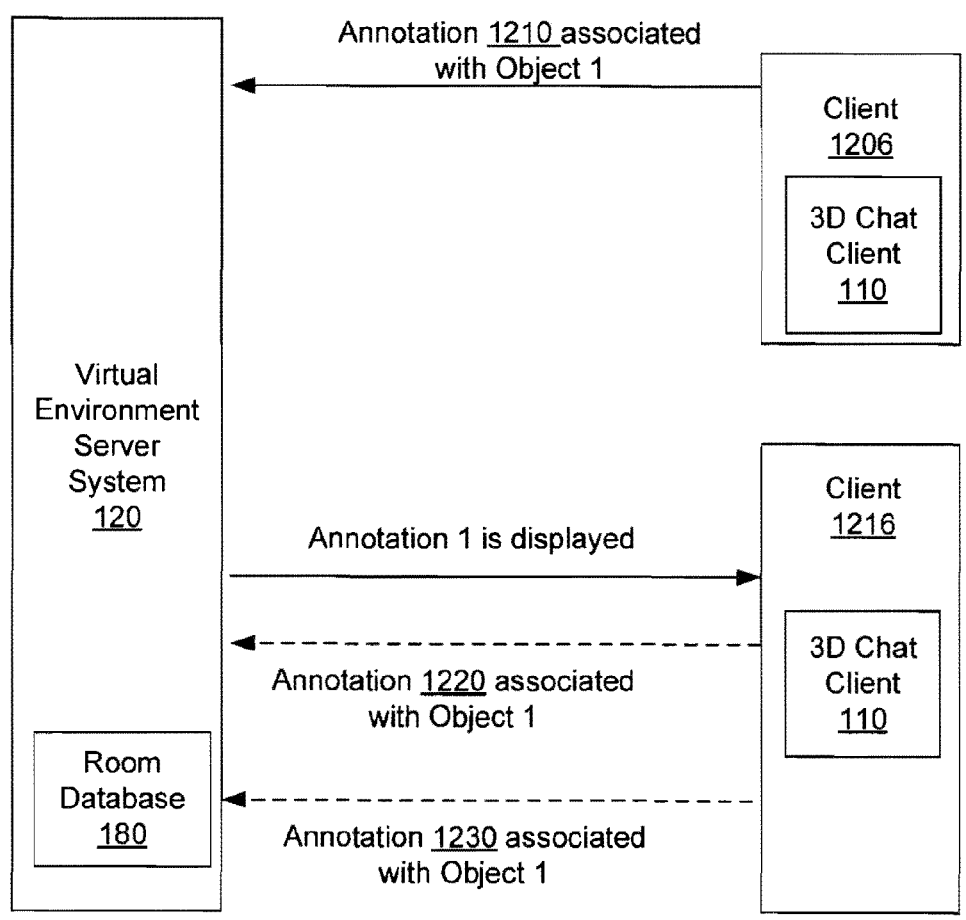
FIG. 12 is a block diagram illustrating an example of a system for annotating an object according to some embodiments of the invention.
Figure 13:
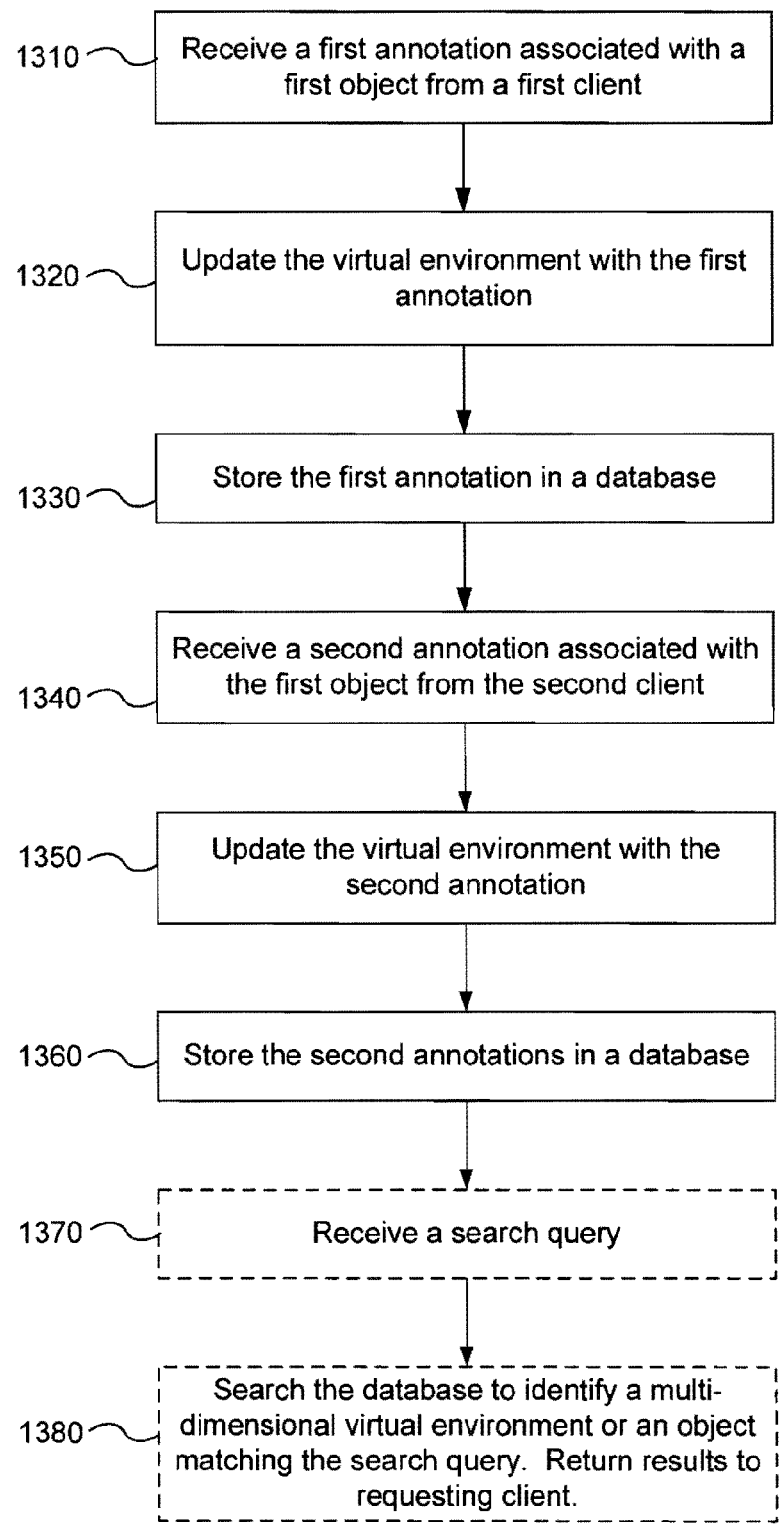
FIG. 13 is a flow chart of an example of a process for annotating an object according to some embodiments of the invention.

The user of a client that is participating in a multi-dimensional virtual environment may want to annotate an object in the multi-dimensional virtual environment. FIGS. 12 and 13 are block diagrams of a system 1200 and method 1300, respectively, for annotating an object in a first multi-dimensional virtual environment according to some embodiments. A client 1206 having a 3D client application 110 is participating in a multi-dimensional virtual environment. The client 106 may be the only participant, or one or more additional clients 1216 also having a 3D client application 110 may be present. The multi-dimensional virtual environment contains at least a first object (referred to as "Object 1" in FIG. 12).

The user of client 1206 annotates the first object. In some embodiments, in order to annotate the first object, the user of client 1206 selects an "annotate" command or attribute associated with the first object. Upon selection of the "annotate" command or attribute, in some embodiments, a text box appears, in which a user of client 1206 can enter an annotation.

The annotation 1210 by client 1206 is transmitted to and received at the virtual environment server system 120. In some embodiments, the annotation is stored in annotations 540 (FIG. 5) as being associated with the first object in the room database 180. As discussed above, the room database 180 (FIG. 4) stores one or more annotations 540 associated with objects in the multi-dimensional virtual environments.

The multi-dimensional virtual environment is updated to display the annotation 1210 by client 1206. In some embodiments, the annotation is displayed in proximity to the first object, so as to make clear that the annotation is associated with the first object. In some embodiments, the annotation is displayed by client 1216 in response to the meeting of a pre-defined condition, such as in response to the entering of a correct password, the avatar of the client 1216 being within a certain radius or proximity of the portal object, and/or the avatar of the client 1216 performing a pre-defined action (e.g., clicking upon the first object using a cursor). In some embodiments, the client 1216 may also annotate the first object. The annotation 1220 by client 1216 may be displayed in place of or in addition to the annotation by client 1206. Both clients 1206 and 1216 may continue to collaboratively annotate the first object. For instance, the client 1216 may annotate the first object again. In some embodiments, the annotation 1230 by client 1216 may be displayed in place of or in addition to other annotations 1210 and 1220 associated with the first object.

Alternately, or in addition, the client 1216 may annotate a second object, in which case the client 1216 sends to the server system 120 the annotation of the second object, and the server system 120 sends the annotation of the second object to the first client 1206 for display at the first client 1206.

Figure 14:
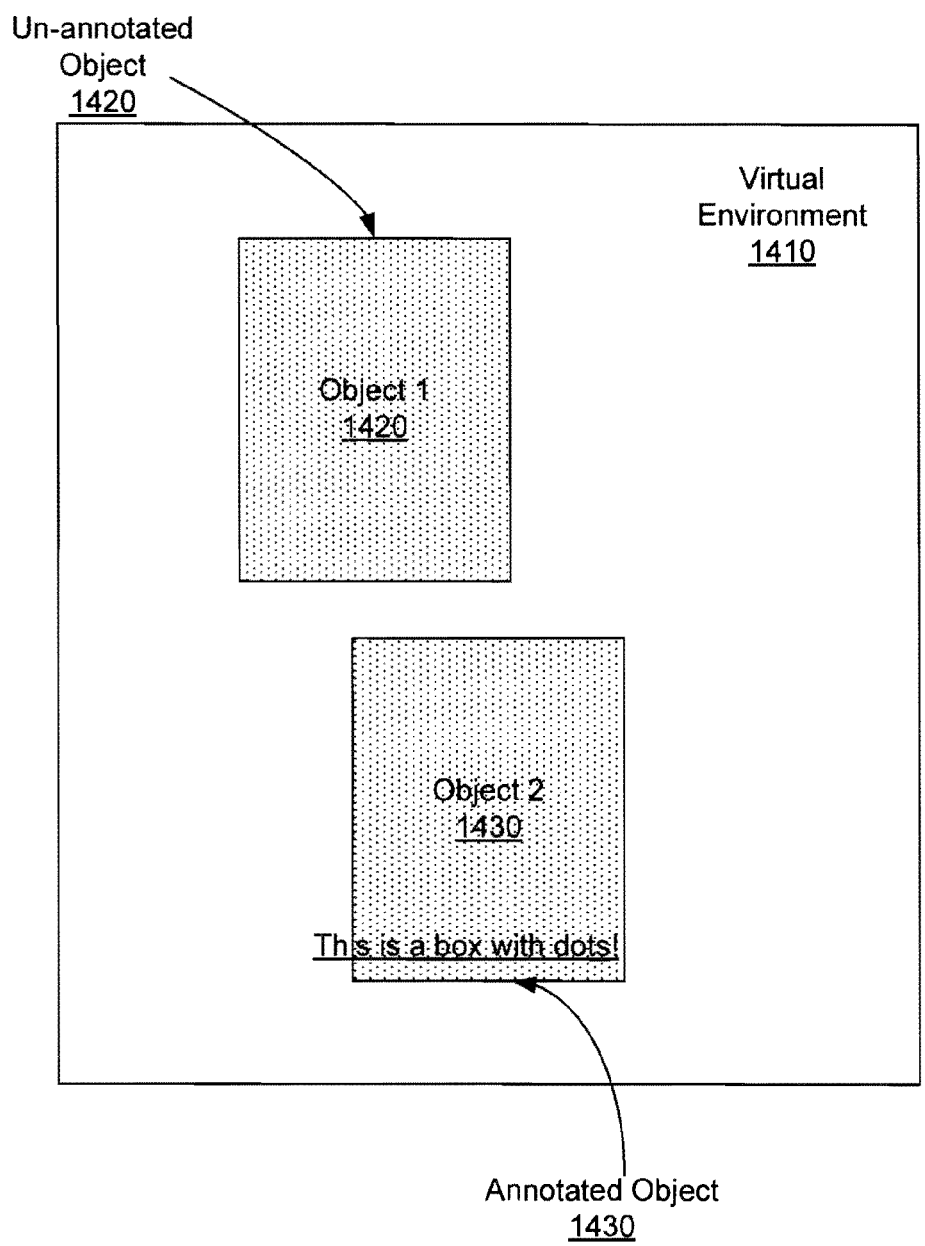
FIG. 14 is a figure illustrating an example of an annotation according to some embodiments of the invention.

FIG. 14 illustrates an example of a virtual environment 1410 having two objects 1420 and 1430. Object 1420 has not been annotated, while object 1430 has been annotated with the annotation: "This is a box with dots!" In some embodiments, the virtual environment 1410 also displays (not shown) an identifier for the avatar that annotated object 1420. In some embodiments, the virtual environment 1410 also displays (not shown) other information, such as time of annotation, version of annotation, and so on.

FIG. 13 illustrates an embodiment of a server-side method 1300 annotating an object in a first virtual multi-dimensional environment according to some embodiments. A client 1206 having a 3D client application 110 is participating in a multi-dimensional virtual environment with at least one other client 1216 having a 3D client application 110. The multi-dimensional virtual environment contains at least a first object.

At 1310, an annotation by client 1206 is received at the virtual environment server system 120. At 1320, the multi-dimensional virtual environment is updated to display the annotation by client 1206. At 1330, the annotation by client 1206 is stored in a database (e.g., the room database 180) as annotations 540 (FIG. 5) associated with the first object.

In some embodiments, the virtual environment server system 120 receives an annotation of the first object by a second client 1216. At 1350, the multi-dimensional virtual environment is updated to display the annotation by client 1216. At 1360, the annotation by client 1206 is stored in a database (e.g., the room database 180) as annotations 540 associated with the first object. As noted above, in some embodiments, whenever an object in a virtual environment is updated (1330, 1360), update information is transmitted to the clients of the current participants in the virtual environment (this operation is not shown if FIG. 13), thereby enabling those clients to display the updated virtual environment.

In some embodiments, at 1370, a search query by a client 106 is received at the virtual environment server system 120. For example, the search query may include one or more terms of an annotation associated with an object in a virtual environment. At 1380, the virtual environment server system 120 searches the room database 180 to identify one or more objects having respective annotations that match the received search query. Alternatively, or in addition, the virtual environment server system 120 searches the room database 180 to identify one or more multi-dimensional virtual environments having respective annotations associated with objects therein that match the received search query. Alternatively, or in addition, the virtual environment server system 120 uses room metadata 410, such as room ID 405 and/or theme 415, to find rooms corresponding to search queries. In addition, in some embodiments a search query received by the server system 120 may be executed by the server system 120 to identify objects, in either the current virtual environment and/or other virtual environments, having object names that match the search query. Information about virtual environments, or objects or both, satisfying the search query is transmitted to the requesting client (not shown).

Referring to FIG. 13, in some embodiments, the search query at 1370 is received by the incoming chat server 135, and delegated by logic 140 to the delegate server 165. At 1380, logic 165 within the delegate server 160 accesses the room database 180 to identify object(s) and/or multi-dimensional virtual environment(s) having respective annotations that match the received search query. In other embodiments, delegate server 160 is not involved in search. Rather, room-related data (including object annotations) is inserted into a general-purpose search engine by the storage server 170 and by other server-side tools. Search queries are sent to the general-purpose search engine via the room server 190, which serves the initial search page, and serves the results pages. Alternately, the delegate server 160 may include such a general-purpose search engine.

In some embodiments, the virtual environment server system 110 enables advanced types of communication between clients participating in a multi-dimensional virtual environment. In these embodiments, as described in reference to FIGS. 15-17, the virtual environment server system 110 determines a concept in the communication between two clients participating in a multi-dimensional virtual environment and searches a media database, such as an image database (or audio database, video database or multimedia database), to find media, such as images (or audio, video or multimedia content), matching the concept.

Figure 15:
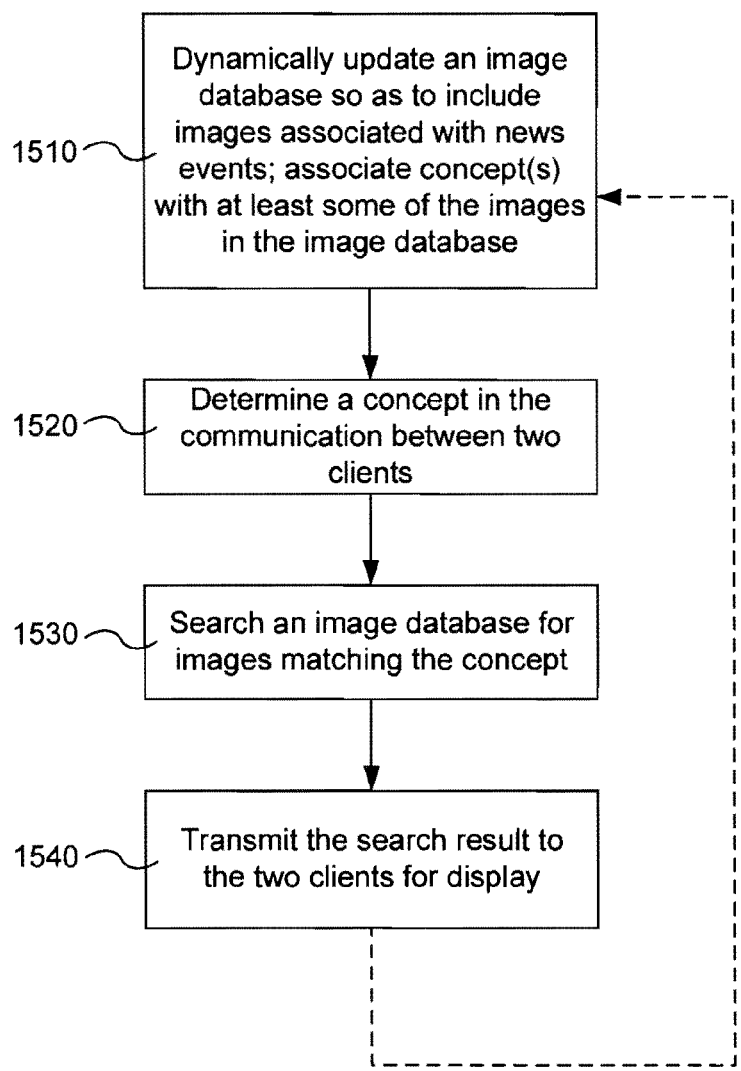
FIG. 15 is a flow diagram illustrating a process for presenting media associated with concepts in communications being exchanged in a multi-dimensional virtual environment, according to some embodiments.
Figure 16:
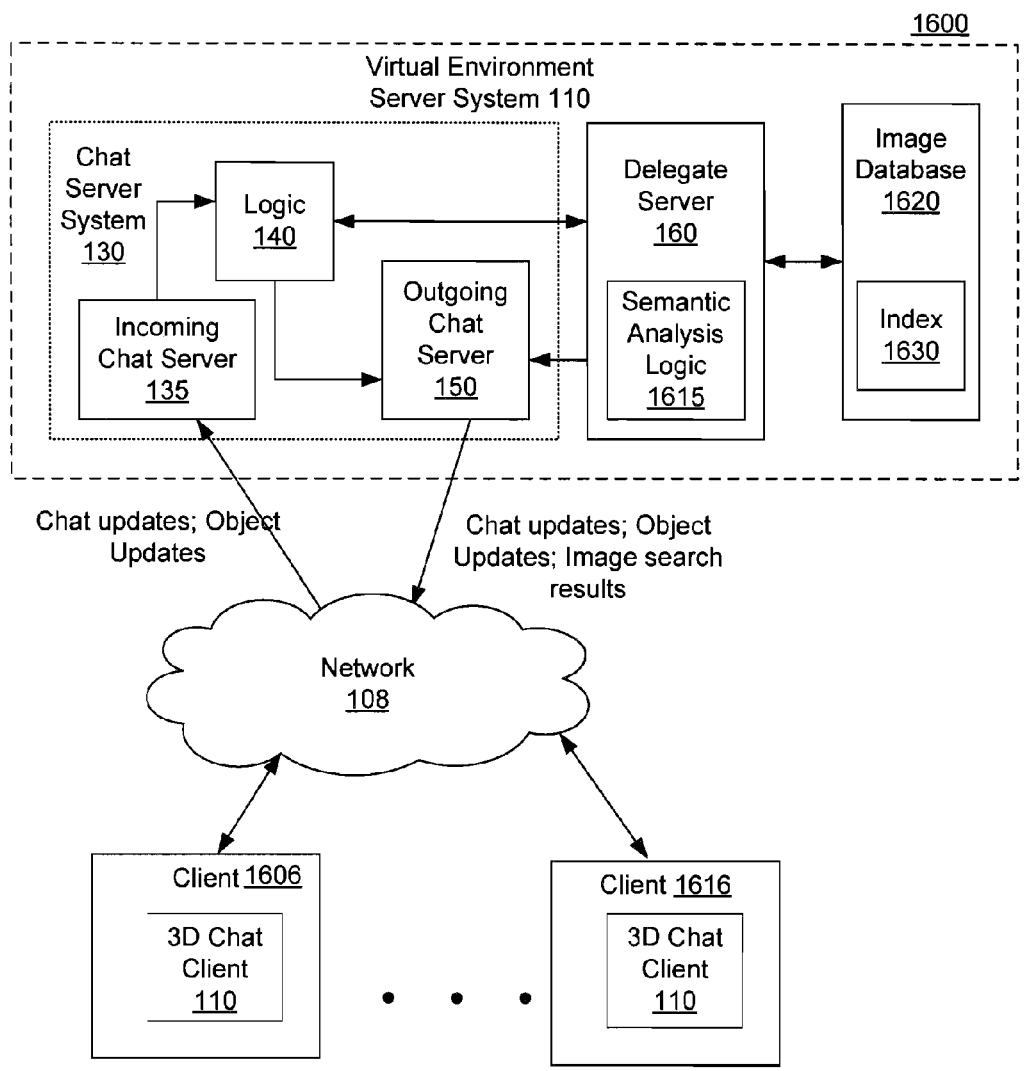
FIG. 16 is a block diagram illustrating an example of a system for presenting media associated with concepts in communications being exchanged in a multi-dimensional virtual environment, according to some embodiments.

FIG. 15 is a flow diagram illustrating a process 1500 for presenting media data, such as displaying images (or presenting audio, video or multimedia content), associated with concepts in communications being exchanged in a multi-dimensional virtual environment, according to some embodiments of the invention. FIG. 16 is a block diagram illustrating a system 1600 for presenting media, such as displaying images, associated with concepts in communications being exchanged in a multi-dimensional virtual environment, according to some embodiments of the invention.

As illustrated in FIG. 16, the virtual environment server system 110 maintains a media database. In the embodiment shown in FIG. 16, the virtual environment server system 110 maintains an image database 1620. At 1510, the image database 1620 is dynamically updated. Further, in some embodiments, the image database 1620 is dynamically updated so as to include images associated with news events.

The delegate server 160 includes semantic analysis logic 1615 to associate concept(s) with at least some of the images in the image database. For example, the delegate server 160 may perform concept mapping logic over a corpus, such as a collection of web documents. For each encountered image, it may analyze or filter the words and terms in anchor tags that point to the image. Similarly, when an image is located in a document (e.g., a news story or web page), text near the image may be similarly analyzed or filtered to determine one or more concepts or categories associated with the image. This concept mapping logic may be performed as a preprocessing step. The results of the association of images to concepts and vice-a-versa may be stored in index 1630 in the image database 1620 or another database (not shown). Thus, index 1630 maps concepts to images.

At 1520, the virtual environment server system 110 determines concepts in communications being exchanged in a multi-dimensional virtual environment. In some embodiments, the incoming chat server 135 receives communications being exchanged in a multi-dimensional virtual environment by clients 1606 and 1616. Logic 140 delegates analysis of the communications to the delegate server 160, which uses semantic analysis logic 1615 to determine one or more concepts associated with the discussion (e.g., of the content of the communications) being had in the multi-dimensional virtual environment by clients 1606 and 1616.

In some embodiments, the one or more concepts that are determined by the semantic analysis logic 1615 are distinct from the actual text of the communications between the first client and second client in the communication session. For instance, if the client 1606 exchanges the following text with client 1616: "I want to rule the world!," the concept "crown" may be determined by the semantic analysis logic 1615, even though the word "crown" does not appear in the statement made by client 1616.

At 1530, an image database 1620 is searched for images that match the concept using the index 1630. The index 1630 maps the concept with images in the image database 1620. In some embodiments, a best result analysis is performed, returning the image that best matches the concept.

At 1540, image search results are transmitted to clients 1606 and 1616 for display. Further, as indicated by the dashed line in FIG. 15, in some embodiments, the index 1630 is searched based on the content of one or more further communications between the first client and second client in the communication session to produce updated image search results. The updated search results are then transmitted to the first and second clients for display at 1540.

In some embodiments, the search result is displayed in a pre-defined region in proximity to the object in the multi-dimensional virtual environment to which it is associated. Further, in some embodiments, the search results are displayed so as to appear to be associated with an object (avatar or non-avatar) in the multi-dimensional virtual environment. Further, in some embodiments, as illustrated in FIG. 17, the search result is displayed as a thought associated with the object in the multi-dimensional virtual environment to which it is associated.

Figure 17:
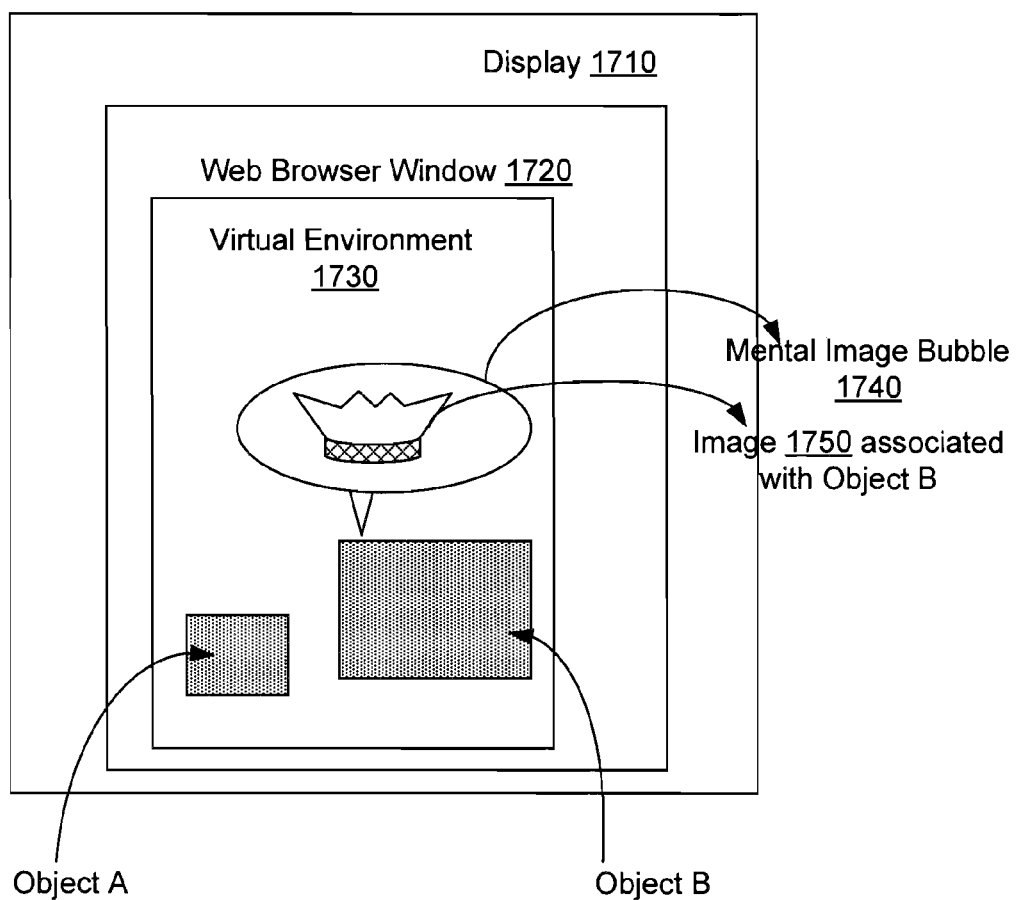
FIG. 17 is a figure illustrating an example of a presentation format according to some embodiments of the invention.

FIG. 17 illustrates a multi-dimensional virtual environment 1700 rendered in a web browser window 1720, in the display 1710 of a client 1606. There are two objects in the multi-dimensional virtual environment 170, object A and object B. Image 1750 that results from the image search result is displayed as an image bubble 1740 associated with Object B. For example, in the example given above, in which the concept "crown" is mapped to a statement by client 1606, whose avatar is Object B of FIG. 17, an image 1750 of a crown appears as an image bubble 1740 associated with avatar Object B.

While FIGS. 15-17 describe presentation of images, other types of media data, such as audio, video and multimedia may be presented.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of sharing information comprising:
at a server system:
exchanging information with a first client and a second client, wherein the first and second clients are mutually participating in a communication session, including:
transmitting to the second client object information representing a plurality of objects in a multi-dimensional virtual environment, the transmitted object information including position information about positions of the plurality of objects in the multi-dimensional virtual environment, wherein the multi-dimensional virtual environment is rendered at the second client and plurality of objects includes a non-avatar object;
transmitting access control data to the second client, the access control data indicating an access level to the multi-dimensional virtual environment for a first user, the access level being determined based on social network information associated with the first user; and
transmitting to the first client a first image for display by a client application, the first image including a representation of the multi-dimensional virtual environment and depicting the plurality of objects including the non-avatar object in the multi-dimensional virtual environment; and
wherein the second client has an application, distinct from the client application, for rendering multi-dimensional virtual environments.

2. The method of claim 1, wherein the client application is a browser application and wherein the application for rendering multi-dimensional virtual environments comprises an add-on, extension or a plug-in to the browser application.

3. The method of claim 1, further comprising:
transmitting to the first client a sequence of images, the sequence of images including representations of the multi-dimensional virtual environment rendered at the second client, the sequence of images including the first image.

4. The method of claim 1, further comprising:
embedding the first image in a web page for display in a region within a web browser window of a display device associated with the first client.

5. The method of claim 1, wherein the first client includes a browser application and wherein the first image is transmitted to the first client in response to an HTTP request from the browser application, the HTTP request corresponding to an image tag inserted into a web page by a script embedded in the web page.

6. The method of claim 1, wherein the first client has a chat application for rendering chat text.

7. The method of claim 1, wherein the plurality of objects includes one or more avatar objects and the method further comprising:
transmitting to the first client a description of actions performed by the one or more avatar objects in the multi-dimensional virtual environment rendered at the second client.

8. The method of claim 1, further comprising:
receiving the first image from the second client.

9. The method of claim 1, further comprising:
generating the first image at the server system.

10. A computer program product comprising a non-transitory computer usable medium including a computer readable program, wherein the computer readable program when executed on a computer causes the computer to:
perform, at a server system, the following steps:
exchange information with a first client and a second client, wherein the first and second clients are mutually participating in a communication session, including:
transmitting to the second client object information representing a plurality of objects in a multi-dimensional virtual environment, the transmitted object information including position information about positions of the plurality of objects in the multi-dimensional virtual environment, wherein the multi-dimensional virtual environment is rendered at the second client and plurality of objects includes a non-avatar object;
transmitting access control data to the second client, the access control data indicating an access level to the multi-dimensional virtual environment for a first user, the access level being determined based on social network information associated with the first user; and
transmitting to the first client a first image for display by a client application, the first image including a representation of the multi-dimensional virtual environment and depicting the plurality of objects including the non-avatar object in the multi-dimensional virtual environment; and
wherein the second client has an application, distinct from the client application, for rendering multi-dimensional virtual environments.

11. The computer program product of claim 10, wherein the client application is a browser application and wherein the application for rendering multi-dimensional virtual environments comprises an add-on, extension or a plug-in to the browser application.

12. The computer program product of claim 10, wherein the computer readable program when executed on the computer causes the computer to also:
transmit to the first client a sequence of images, the sequence of images including representations of the multi-dimensional virtual environment rendered at the second client, the sequence of images including the first image.

13. The computer program product of claim 10, wherein the computer readable program when executed on the computer causes the computer to also:
embed the first image in a web page for display in a region within a web browser window of a display device associated with the first client.

14. The computer program product of claim 10, wherein the first client includes a browser application and wherein the first image is transmitted to the first client in response to an HTTP request from the browser application, the HTTP request corresponding to an image tag inserted into a web page by a script embedded in the web page.

15. The computer program product of claim 10, wherein the first client has a chat application for rendering chat text.

16. The computer program product of claim 10, wherein the plurality of objects includes one or more avatar objects and the computer readable program when executed on the computer causes the computer to also:
transmit to the first client a description of actions performed by the one or more avatar objects in the multi-dimensional virtual environment rendered at the second client.

17. The computer program product of claim 10, wherein the computer readable program when executed on the computer causes the computer to also:
receive the first image from the second client.

18. A system comprising:
a processor; and
a memory storing instructions that when executed cause a server system to:
exchange information with a first client and a second client, wherein the first and second clients are mutually participating in a communication session, including:
transmitting to the second client object information representing a plurality of objects in a multi-dimensional virtual environment, the transmitted object information including position information about positions of the plurality of objects in the multi-dimensional virtual environment, wherein the multi-dimensional virtual environment is rendered at the second client and plurality of objects includes a non-avatar object;
transmitting access control data to the second client, the access control data indicating an access level to the multi-dimensional virtual environment for a first user, the access level being determined based on social network information associated with the first user; and
transmitting to the first client a first image for display by a client application, the first image including a representation of the multi-dimensional virtual environment and depicting the plurality of objects including the non-avatar object in the multi-dimensional virtual environment; and
wherein the second client has an application, distinct from the client application, for rendering multi-dimensional virtual environments.

* * * * *